United States Patent [19]

Suzuki et al.

[11] Patent Number: 5,341,234

[45] Date of Patent: Aug. 23, 1994

[54] SELF-ROUTING NETWORK USING OPTICAL GATE ARRAY DRIVEN BY CONTROL VOLTAGES COINCIDENTAL WITH PACKET HEADER PULSES

[75] Inventors: Shuji Suzuki; Makoto Nishio, both of Tokyo, Japan

[73] Assignee: Nec Corporation, Tokyo, Japan

[21] Appl. No.: 792,191

[22] Filed: Nov. 14, 1991

[51] Int. Cl.$^5$ .................. H04J 14/00; H04J 14/02
[52] U.S. Cl. ...................... 359/117; 359/128; 359/139; 370/58.1; 370/60.1; 370/94.1
[58] Field of Search ............... 359/117, 128, 139, 137, 359/109, 165, 123, 173; 370/58.1, 58.2, 58.3, 60, 60.1, 94.1; 385/16, 17

[56] References Cited

U.S. PATENT DOCUMENTS

| | | | |
|---|---|---|---|
| 3,141,067 | 7/1964 | Spandorfer | 179/18 |
| 4,731,878 | 3/1988 | Vaidya | 370/60 |
| 4,787,692 | 11/1988 | Spanke | 385/16 |
| 4,894,818 | 1/1990 | Fujioka et al. | 359/123 |
| 4,939,721 | 7/1990 | DeBosio | 359/117 |
| 5,005,166 | 5/1991 | Suzuki et al. | 359/117 |
| 5,018,130 | 4/1991 | Suzuki et al. | 359/115 |
| 5,023,864 | 6/1991 | Cloonan et al. | 359/109 |
| 5,181,134 | 1/1993 | Fatehi et al. | 359/128 |
| 5,194,977 | 3/1993 | Nishio | 359/128 |

FOREIGN PATENT DOCUMENTS 945373 12/1963 United Kingdom ............... 379/253

OTHER PUBLICATIONS

Ogura et al., "Reconfigurable Optical Interconnection Using a Two-Dimensional Vertical To Surface Transmission Electrophotonic Device Array", Applied Physics Letters, vol. 57, New York US, pp. 540–542.

Prucnal, et al. "Self-Routing Optical Switch with Optical Processing", Springer Series in Electronics and Photonics, vol. 25, pp. 193–195.

Ogura, et al. "A Novel Optical Self-Routing Switch with a Wavelength Filtering Function Using a Vertical to Surface Transmission Electro-Photonic Device", The 22nd International Conference on Solid-State Devices and Materials, 1990.

Primary Examiner—Richard E. Chilcot, Jr.
Assistant Examiner—Rafael Bacares
Attorney, Agent, or Firm—Foley & Lardner

[57] ABSTRACT

In an optical self-muting network, N optical splitters are associated respectively, with N inlet terminals for splitting an optical signal from the associated inlet terminal into M replicas of the optical signal. M optical combiners, associated respectively with M outlet terminals, combines N optical signals incident thereon into a combined optical signal and couples it to the associated outlet terminal. M sets of N optical gates are connected between the N optical splitters and the M optical combiners. Each optical gate allows passage of an optical signal incident thereon when it timely coincides with an electrical signal applied thereto. A controller supplies a gate control electrical signal to the optical gates of each set during M successive intervals. Contention between optical packets simultaneously incident on the optical gates of the same set is resolved by the controller.

19 Claims, 20 Drawing Sheets

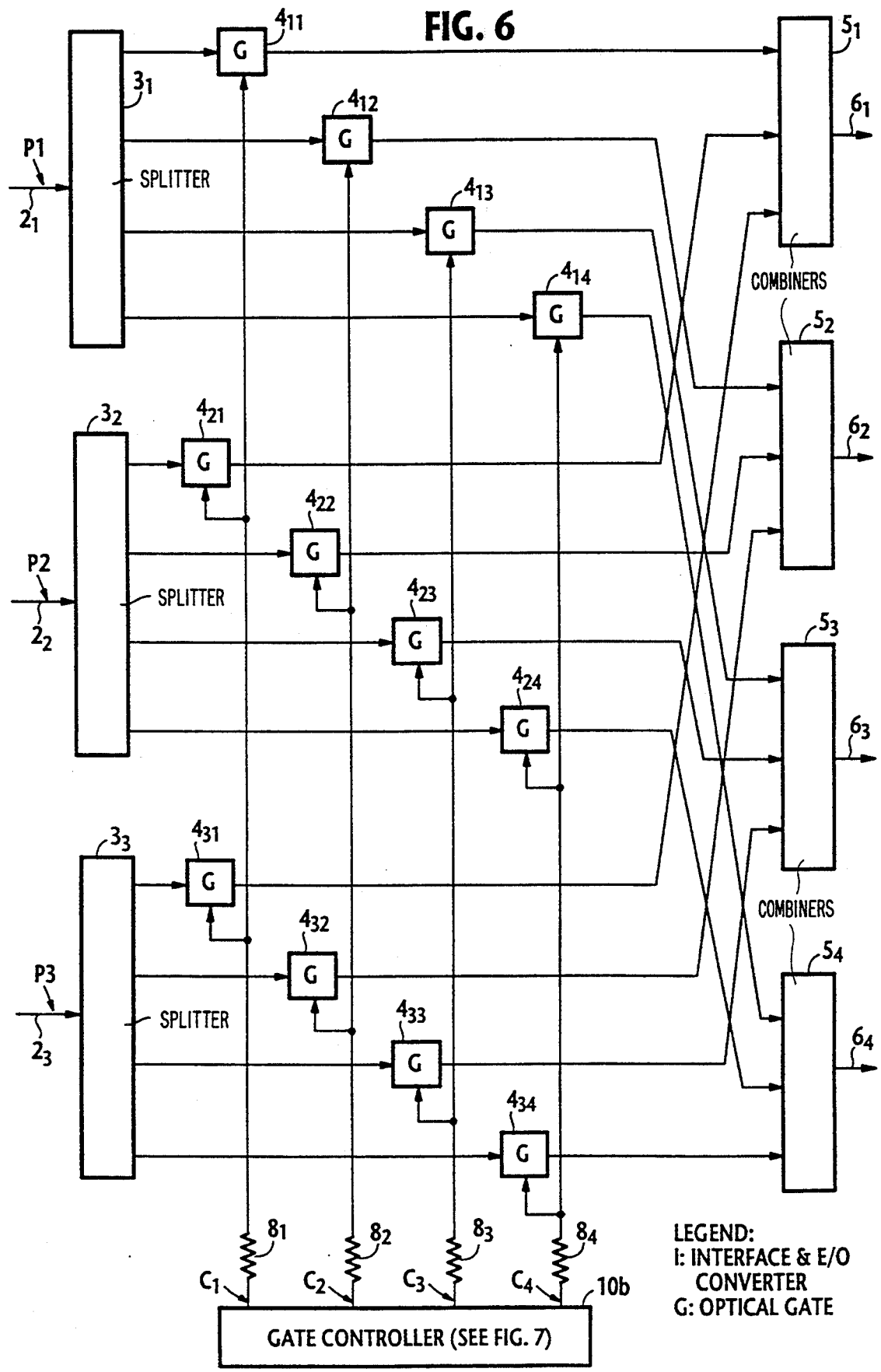

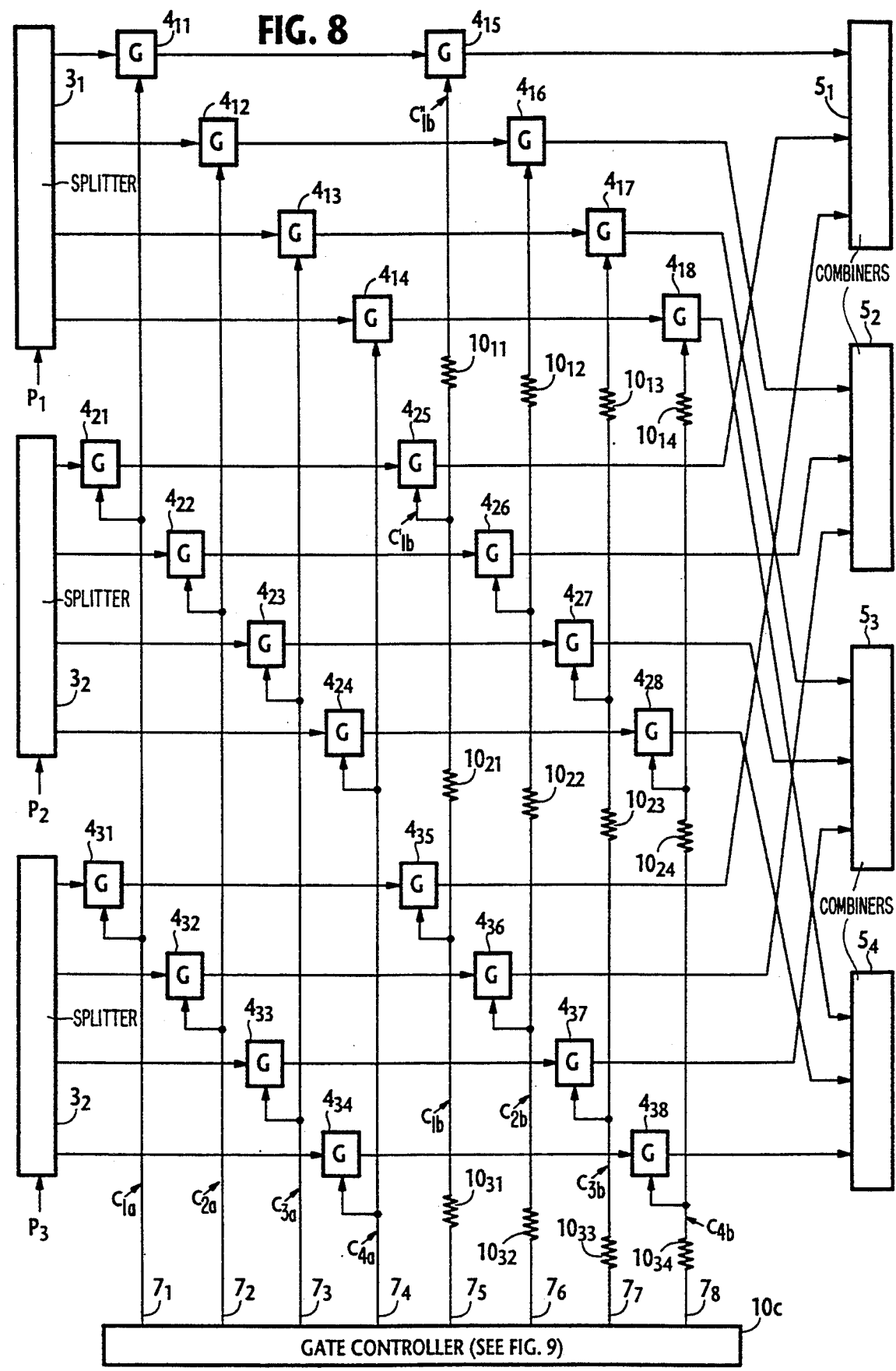

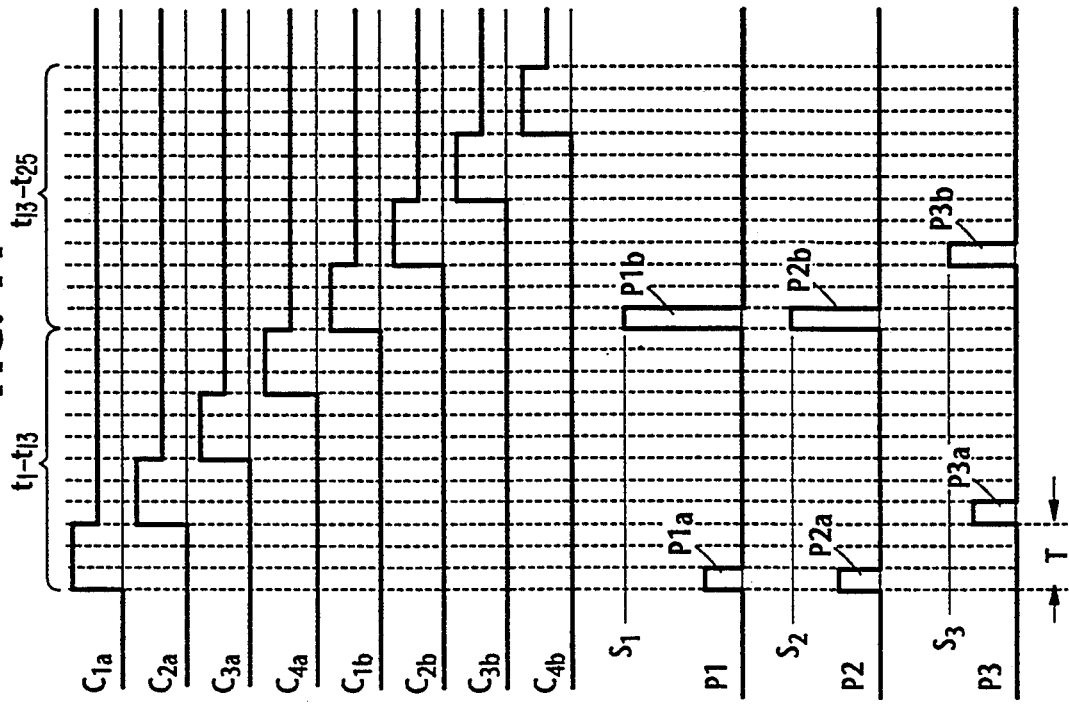
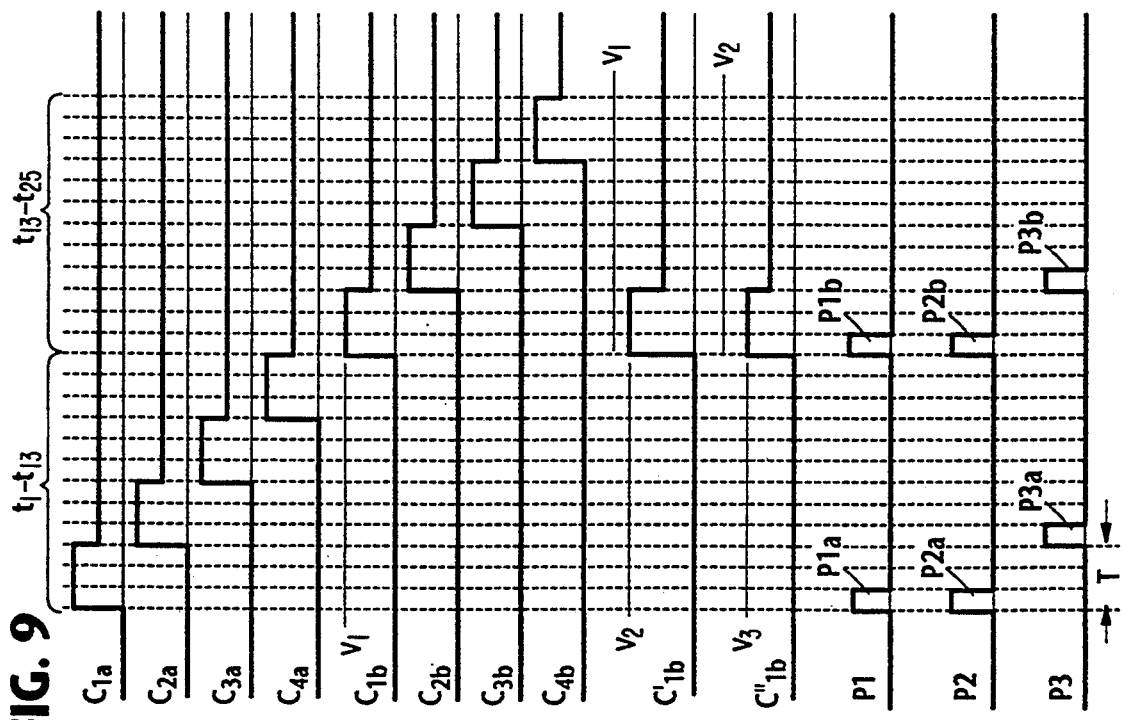

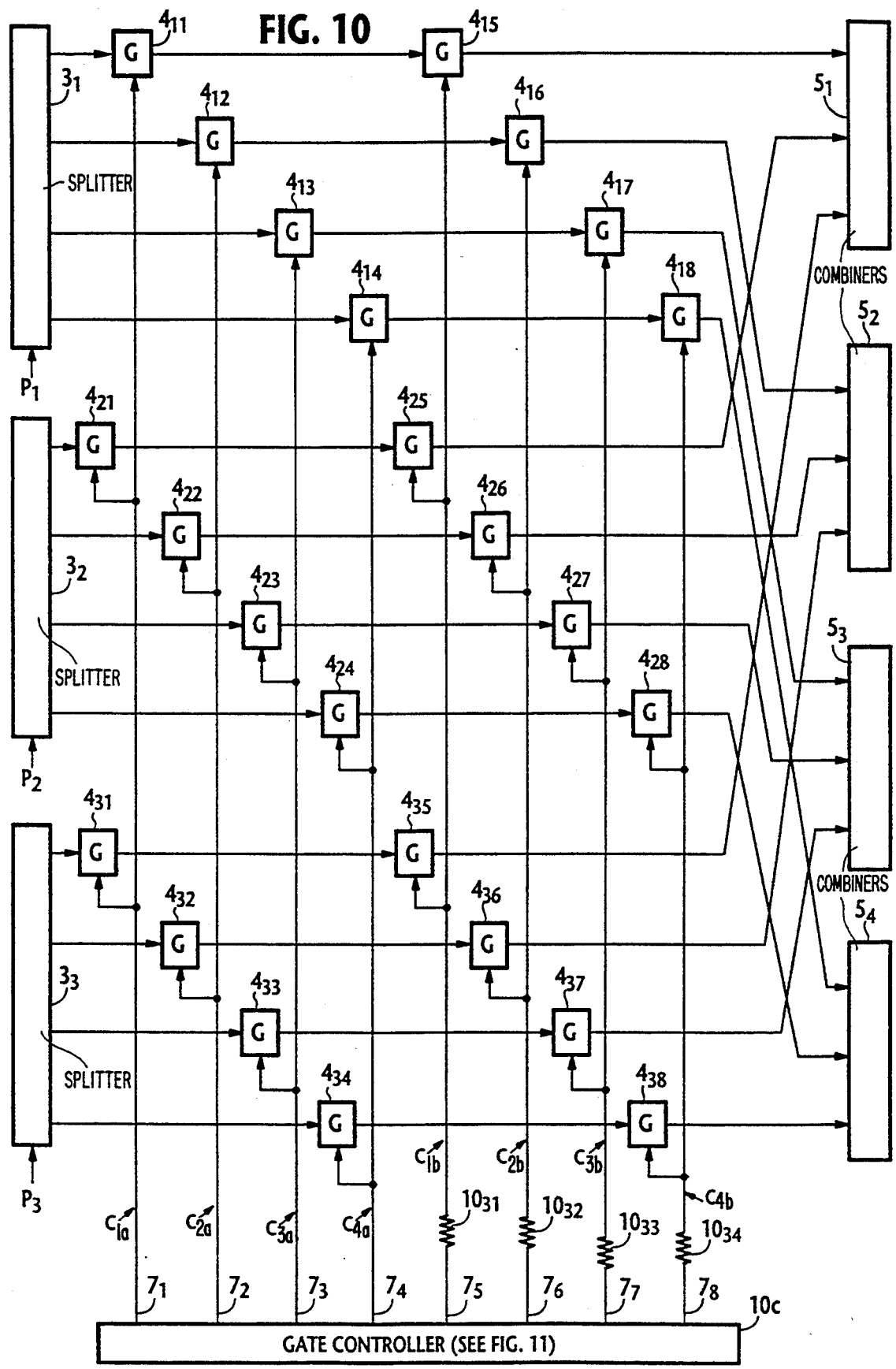

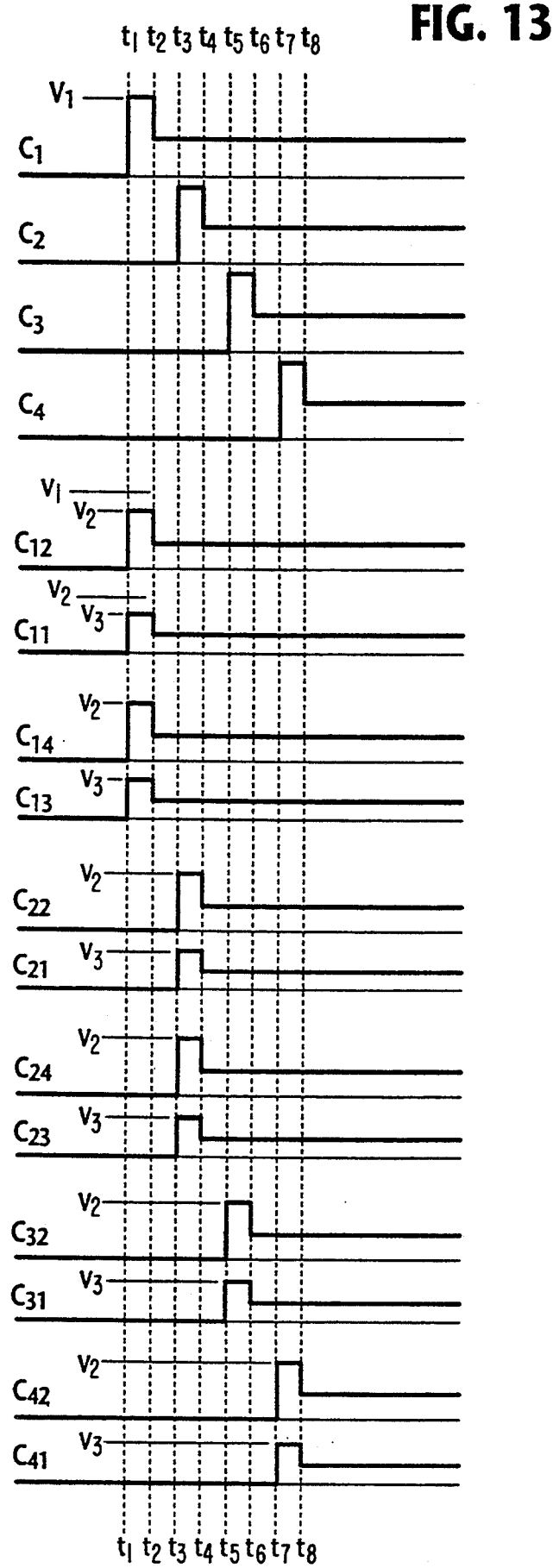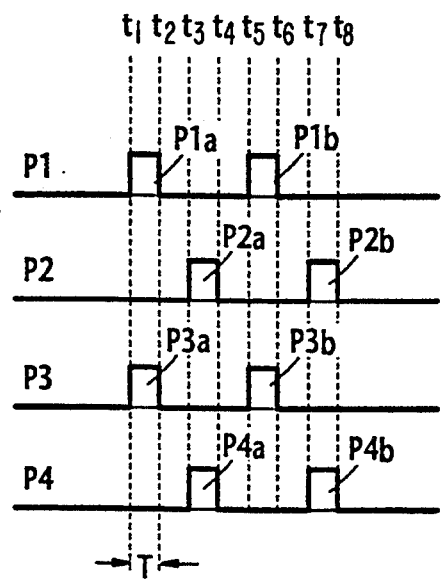
FIG. 13

FIG. 17
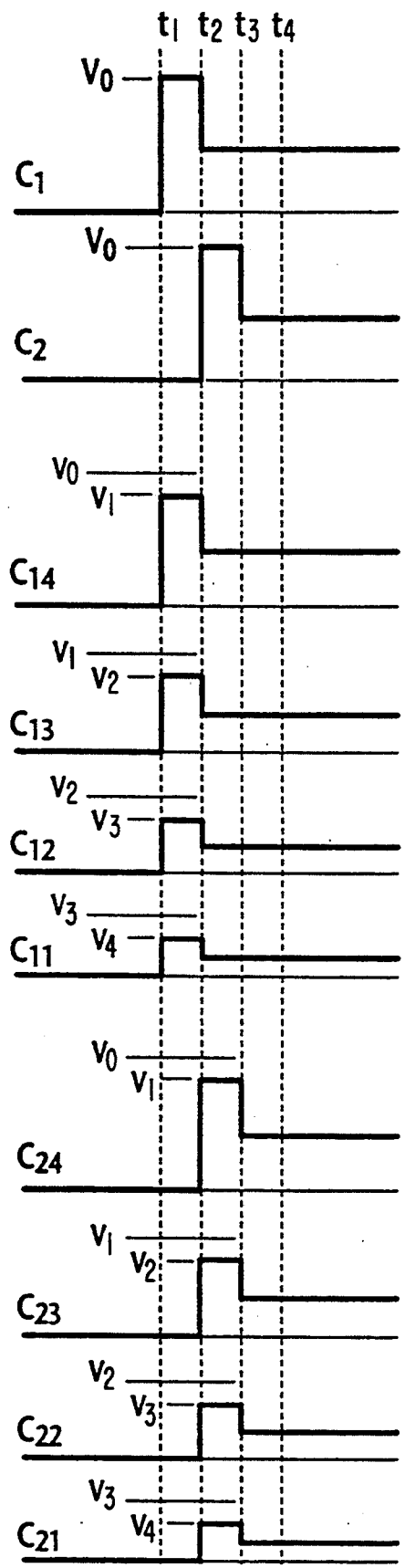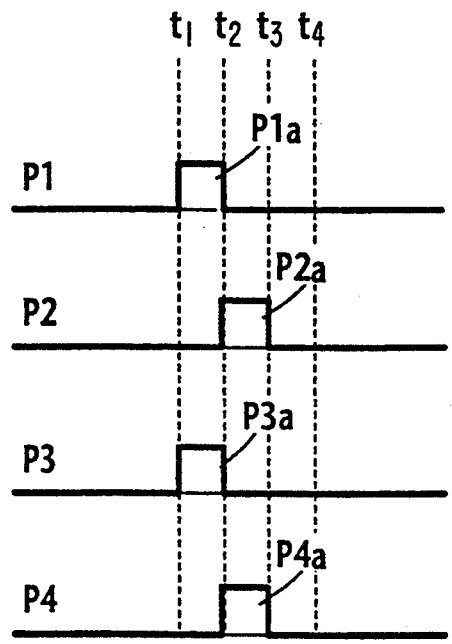

SELF-ROUTING NETWORK USING OPTICAL GATE ARRAY DRIVEN BY CONTROL VOLTAGES COINCIDENTAL WITH PACKET HEADER PULSES

This application is related to co-pending U.S. patent application Ser. No. 07/692,850, filed Apr. 29, 1991 and assigned to the same assignee as the present application.

BACKGROUND OF THE INVENTION

The present invention relates generally to optical self-routing networks for routing optical packets according to the information contained in the header of the packets.

In a prior art optical self-routing network, as described in "Springer Series in Electronics and Photonics", Vol, 25, pages 193-195, an optical packet is fed into a splitter, in which it is split into two replicas of the input signal, one being applied to an optical switch having two outlet terminals, and the other to an optical correlator. The optical correlator generates an optical output if the header of the incoming packet contains a predetermined bit sequence. The output of the correlator is converted to an electrical signal, amplified and applied to the control electrode of the optical switch to direct the incident light to one of its outlet terminals.

However, a serious disadvantage of the prior art system is that the circuit complexity and practical implementation require a vast amount of optical, electro-optical and electronic components.

SUMMARY OF THE INVENTION

It is therefore an object of the present invention to provide an optical self-routing network which allows implementation with a smaller number of components.

According to the present invention, the optical self-routing network comprises N optical splitters associated respectively with N inlet terminals. Each of the splitters splits an optical signal from the associated inlet terminal into M replicas of the optical signal. M optical combiners are associated respectively with M outlet terminals, each of the optical combiners combining N optical signals incident thereon into a combined optical signal and coupling the combined optical signal to the associated outlet terminal. M sets of N optical gates are connected between the N optical splitters and the M optical combiners. Each of the optical gates allows passage of an optical signal incident thereon when it timely coincides with an electrical signal applied thereto. Gate control means are provided for supplying a gate control electrical signal to the optical gates of each set during M successive intervals. Priority selection is provided by the gate control means for selecting one of the optical packets which are simultaneously made to be incident on the optical gates of each set when contention or competition arises among the optical packets.

According to a first aspect of the priority selection, the gate control means supplies successively shifted gate control electrical signals respectively to the optical gates of each set. Thus, one of the optical gates of a given set exclusively allows passage of an optical signal incident thereon when the gate control electrical signal applied thereto is the earliest of the gate control electrical signals which are successively applied to the optical gates of the given set.

According to a second aspect of the priority selection, the optical gates of each set are commonly assigned a unique time interval, and those of the optical signals which are supplied to the optical gates of each set are successively shifted during the unique time interval. The gate control means exclusively causes one of the optical gates of each set to allow passage of an optical signal incident thereon when the incident optical signal is the earliest of the optical signals incident on the optical gates of the set.

According to a third specific aspect of the priority selection, the gate control means simultaneously supplies gate control electrical signals of different amplitudes respectively to the optical gates of each set so that one of the optical gates of a given set exclusively allows passage of an optical signal incident thereon when the amplitude of the gate control electrical signal applied thereto is the highest of the signals applied to the optical gates of the given set.

According to a fourth aspect of the priority selection, the gate control means simultaneously supplies gate control electrical signals of different amplitudes respectively to the optical gates of each set so that one of the optical gates of a given set exclusively allows passage of an optical signal incident thereon when the light intensity of the incident optical signal is the highest of the optical signals incident on the optical gates of the given set.

In a preferred embodiment of this invention, the optical signals are respectively carried on a plurality of wavelengths, and each of the optical gates is selectively transmissive of an optical signal of one of the wavelengths.

BRIEF DESCRIPTION OF THE DRAWINGS

The present invention will be described in further detail with reference to the accompanying drawings, in which:

FIG. 6 is a block diagram of a modified form of the second embodiment of this invention;

FIG. 8 is a block diagram of a third embodiment of the present invention;

FIG. 9 is a timing diagram associated with FIG. 8;

FIG. 10 is a block diagram of a modified form of the third embodiment;

FIG. 11 is a timing diagram associated with FIG. 10;

FIG. 13 is a timing diagram associated with FIG. 12;

FIG. 17 is a timing diagram associated with FIG. 16;

DETAILED DESCRIPTION

Figure 1:
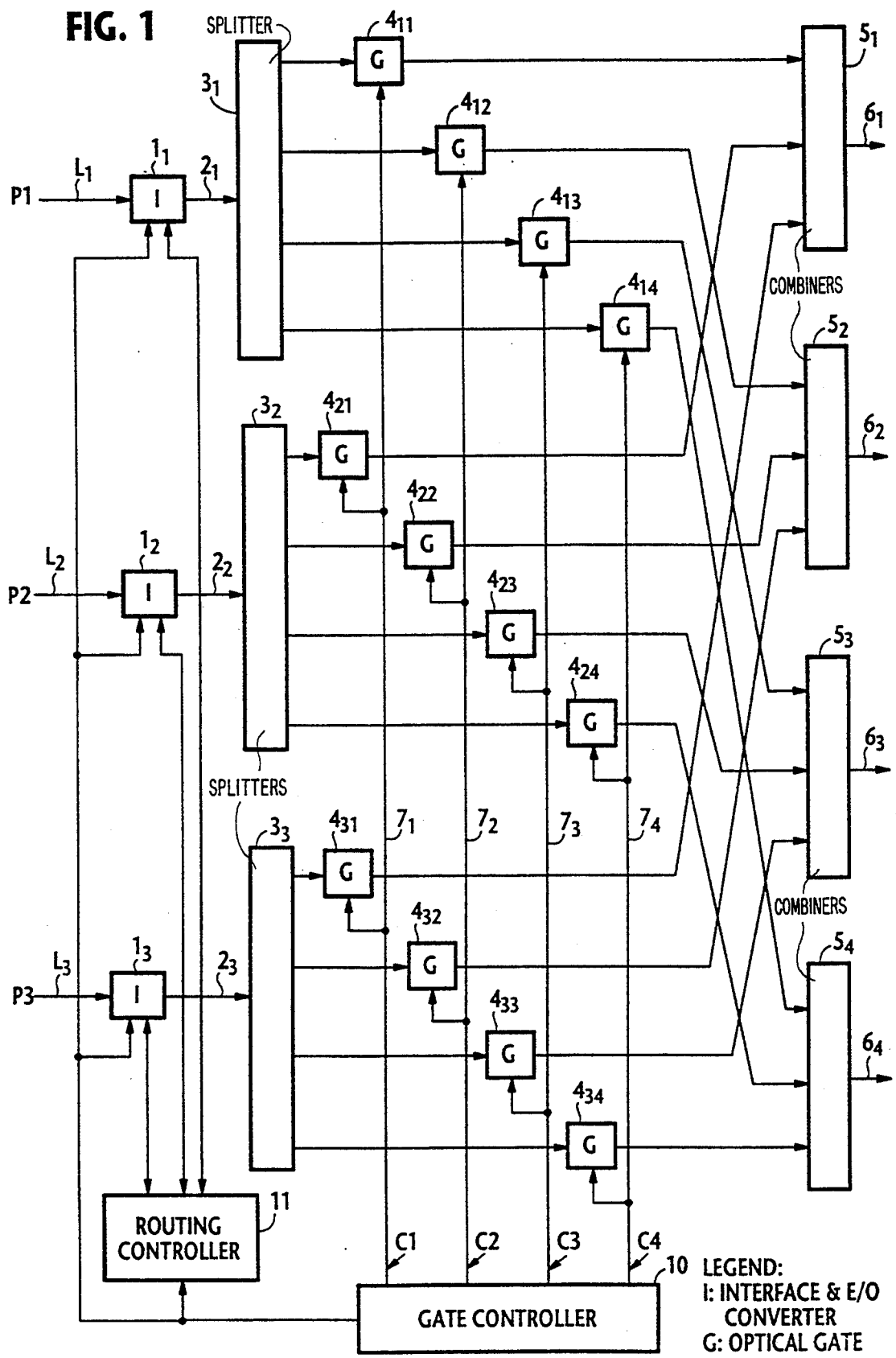
FIG. 1 is a block diagram of the optical self-routing network according to a first embodiment of the present invention.

Referring now to FIG. 1, there is shown an optical self-routing network according to a first embodiment of the present invention. For purposes of disclosure, the self-routing network is shown as a 3×4 switch configuration. The network has three inlet terminals $2_1$, $2_2$ and $2_3$, three optical splitters $3_1$, $3_2$, $3_3$ respectively coupled to the inlet terminals for splitting a respective optical input into four replicas of the optical input. A 3×4 array of optical gates $4_{11}$–$4_{34}$ are provided, the gates being horizontally arranged to form three groups of four gates $4_{i1}$, $4_{i2}$, $4_{i3}$ and $4_{i4}$ (where i=1, 2 and 3) and vertically arranged to form four sets of three gates $4_{1j}$, $4_{2j}$ and $4_{3j}$ (where j=1, 2, 3 and 4). Different groups of optical gates are associated respectively with optical splitters $3_1$, $3_2$, $3_3$, and different sets of the optical gates are associated respectively with optical combiners $5_1$, $5_2$, $5_3$ and $5_4$, each of which provides a combined signal of the respective optical inputs. The outputs of combiners $5_1$, $5_2$, $5_3$ and $5_4$ are coupled respectively to outlet terminals $6_1$, $6_2$, $6_3$ and $6_4$ of the network.

All optical gates are driven by electrical pulses that are supplied from a gate controller 10. The driving pulses have a particular timing and amplitude pattern determined in a manner to be described in detail later.

From user stations, electrical signals in the form of packets are transmitted on access lines $L_1$, $L_2$ and $L_3$ to respective line interface circuits $1_1$, $1_2$, and $1_3$. Overall control of the network is provided by a routing controller 11 which is coupled to line interface circuits $1_1$, $1_2$, $1_3$. Each packet from user stations contains a header followed by a sequence of data bits. Routing controller 11 reads the header information of each incoming packet, assigns one or more pulse positions, or time slots in the header of that packet using amplitude and timing information from gate controller 10, and instructs the associated interface circuit to insert one or more header pulses into the assigned time slots of the packet for routing it to a desired outlet terminal. As will be described, the assignment of time slots is determined in relation to the timing and amplitude patterns of the driving pulses generated by the gate controller 10.

Each of the line interface circuits $1_1$, $1_2$, $1_3$ includes an electro-optical converter. After header pulse insertion, the incoming packets are converted to optical signals to form the inputs to the network and supplied to optical splitters $3_1$, $3_2$, $3_3$ via inlet terminals $2_1$, $2_2$, $2_3$ respectively.

As described in the aforesaid Co-pending U.S. patent application and in a paper by I. Ogura et al. titled "A Novel Switch with Surface Transmission Electro-photonic Device" (The 22nd International Conference On Solid-State Devices and Materials, 1990), each of the optical gates 4 is a gate-controlled, heterojunction semiconductor device which is excited when optical energy incident thereon timely coincides with a short-duration, high triggering potential at the gate and remains excited by a long-duration, low bias potential that follows. During this excited state, the incident optical energy is allowed to pass through the device.

Figure 2:
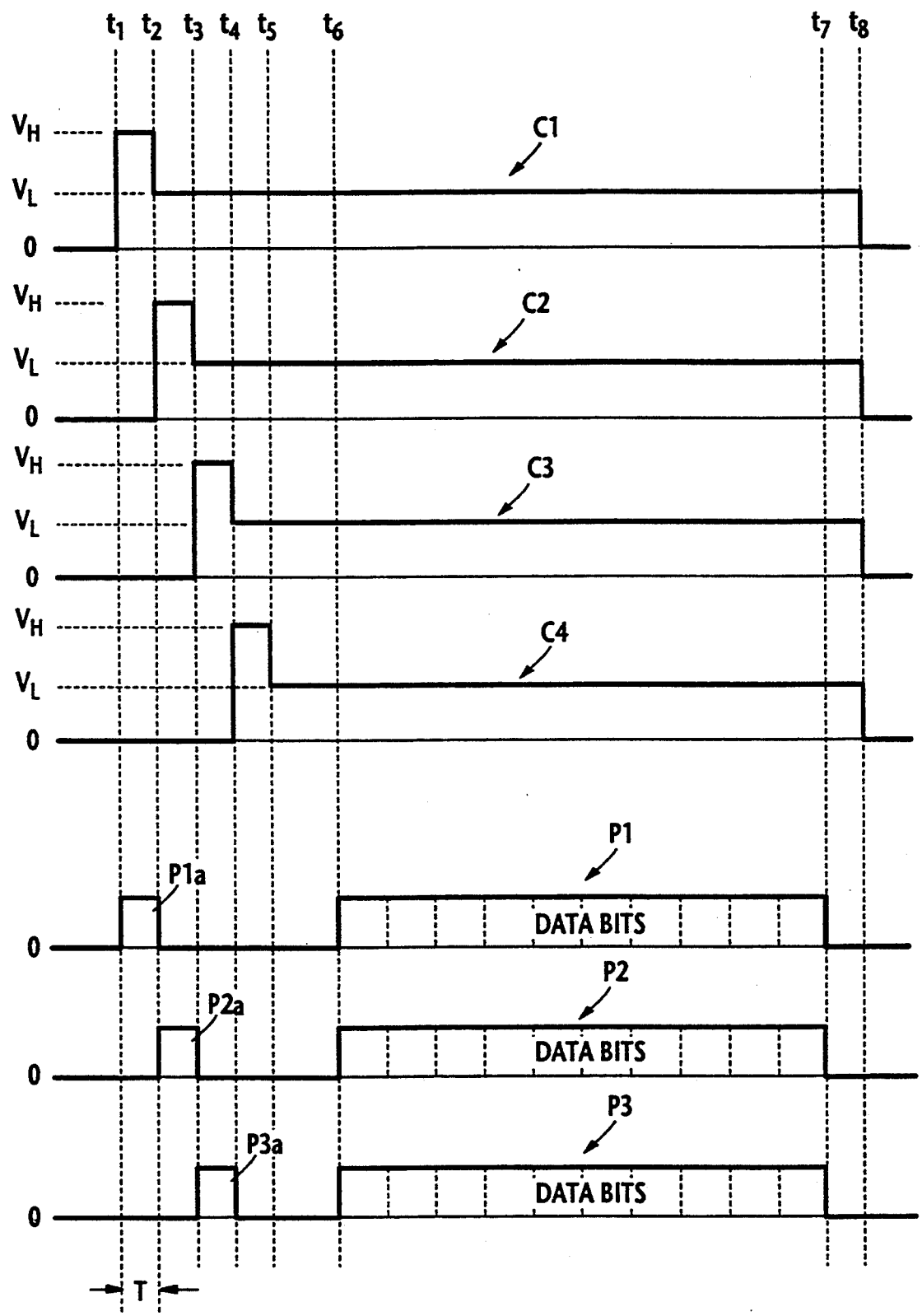
FIG. 2 is a timing diagram associated with the first embodiment.

As shown in FIG. 2, gate controller 10 generates control voltage pulses C1, C2, C3 and C4, each having a high triggering voltage $V_H$ of duration T that exists anywhere between times $t_1$ and $t_5$ and a trailing, low bias voltage $V_L$ that exists until time $t_8$. Control pulses C1, C2, C3 and C4 are respectively applied to conductors $7_1$, $7_2$, $7_3$ and $7_4$ that lead to the optical gates $4_{i1}$, $4_{i2}$, $4_{i3}$ and $4_{i4}$, where i=1, 2 and 3 respectively, as shown in FIG. 1. It is assumed that incoming optical packets P1, P2 and P3 appear at inlet terminals $2_1$, $2_2$ and $2_3$, respectively. If the destinations of packets P1, P2 and P3 are such that they should be routed to outlet terminals $6_1$, $6_2$ and $6_3$, respectively, then header pulses P1a, P2a and P3a are respectively inserted by interface circuits $1_1$, $1_2$ and $1_3$ into time slots (or header slots) $t_1$–$t_2$, $t_2$–$t_3$ and $t_3$–$t_4$ of optical packets P1, P2 and P3. In this way, header pulses P1a, P2a and P3a respectively coincide with the triggering voltages $V_H$ of control pulses C1, C2 and C3. Note that data bits of each optical packet occupy the same interval between times $t_6$ and $t_7$.

In response to the coincidence between the triggering voltage $V_H$ of pulse C1 and header pulse P1a, optical gate $4_{11}$ changes to an excited state and maintains it under the influence of the trailing bias voltage $V_L$. Thus, optical packet P1 is allowed to pass through gate $4_{11}$ to optical combiner $5_1$ and appears at outlet terminal $6_1$. Likewise, the coincidence between the triggering voltage $V_H$ of pulse C2 and header pulse P2a causes optical gate $4_{22}$ to be excited, allowing optical packet P2 to be routed to outlet terminal $6_2$ and the coincidence between the triggering voltage $V_H$ of pulse C3 and header pulse P3a causes optical gate $4_{33}$ to be excited, allowing packet P3 to be routed to outlet terminal $6_3$. It is seen that if any of these packets is destined to outlet terminal $6_4$, a header pulse will be inserted in time slot $t_4$–$t_5$ of the packet. In this way, an optical input to any one of splitters $3_1$, $3_2$, $3_3$ can be routed through the network to any one of outlet terminals $6_1$, $6_2$, $6_3$ and $6_4$ by controlling the position of header pulses.

Figure 3:
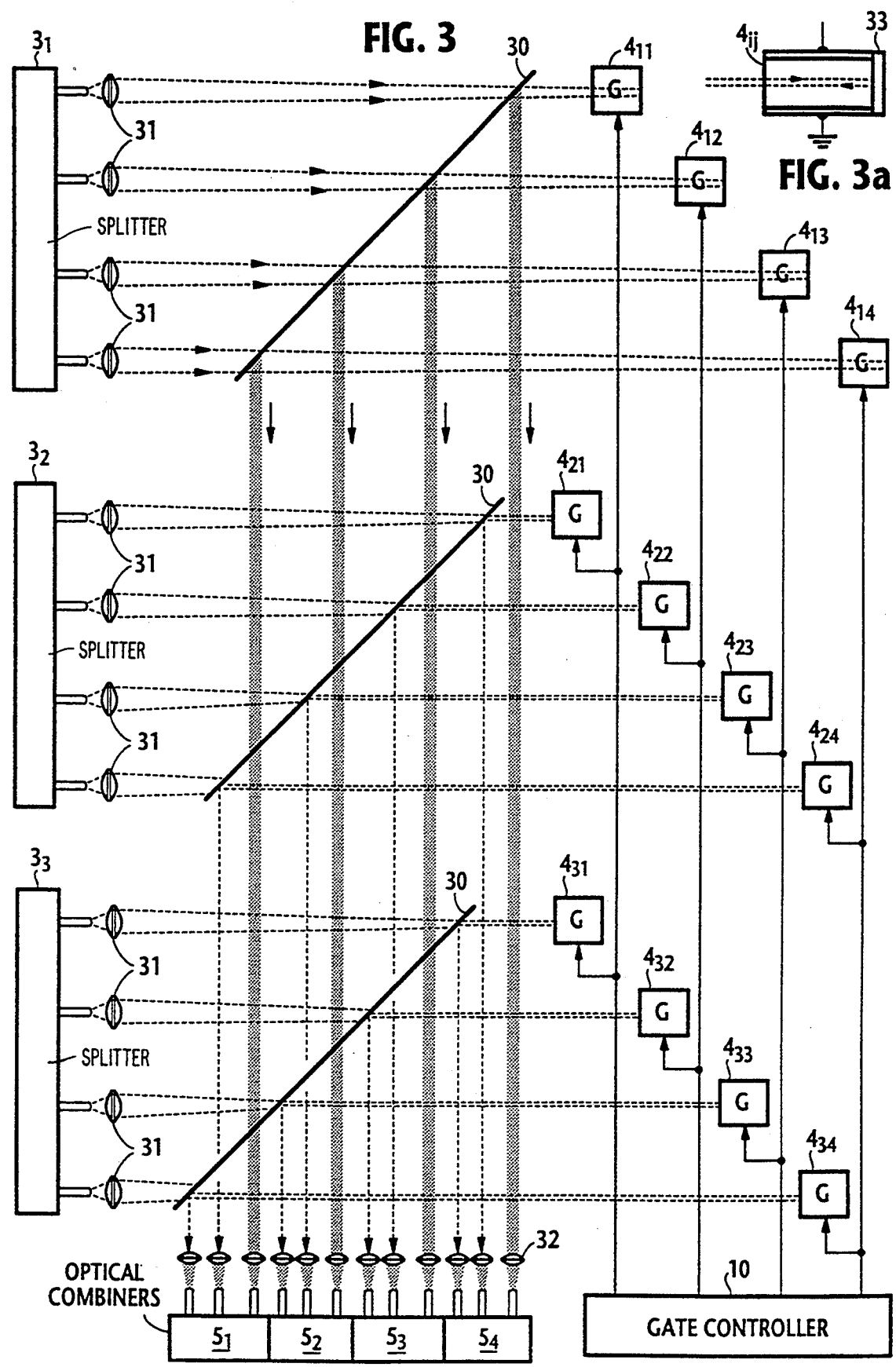
FIG. 3 is a block diagram of a modified form of the first embodiment of this invention, FIG. 3a being a side view of each optical gate.

A flexible arrangement of the self-routing network can be implemented by a modified form of the invention as shown in FIG. 3. In this modification, half-silvered mirrors 30 are positioned between optical splitters $3_1$, $3_2$, $3_3$ and the optical gate array, and an array of optical lenses 31 are disposed on the outputs of splitters $3_1$, $3_2$ and $3_3$ to direct their output light beams through the half-silvered mirrors to the associated optical gates. Optical lenses 32 are disposed on the input ends of combiners $5_1$, $5_2$, $5_3$ and $5_4$ to focus incident light beams to the combiners. Each optical gate $4_{ij}$ is provided with a reflecting mirror 33 at one end of the device remote from the associated optical splitters as shown in FIG. 3a. When each of the optical gates is excited, the light incident thereon is reflected off the wall 33 to the half-silvered mirror through which it has passed and where it bends its course at right angles to a corresponding one of lenses 32.

Due to possible timing inaccuracies, two or more header pulses may occur during the period of the same triggering voltage. In such situations, collision occurs at the inputs of an optical combiner to which the packets are destined. The following embodiments overcome this data collision problem.

Figure 4:
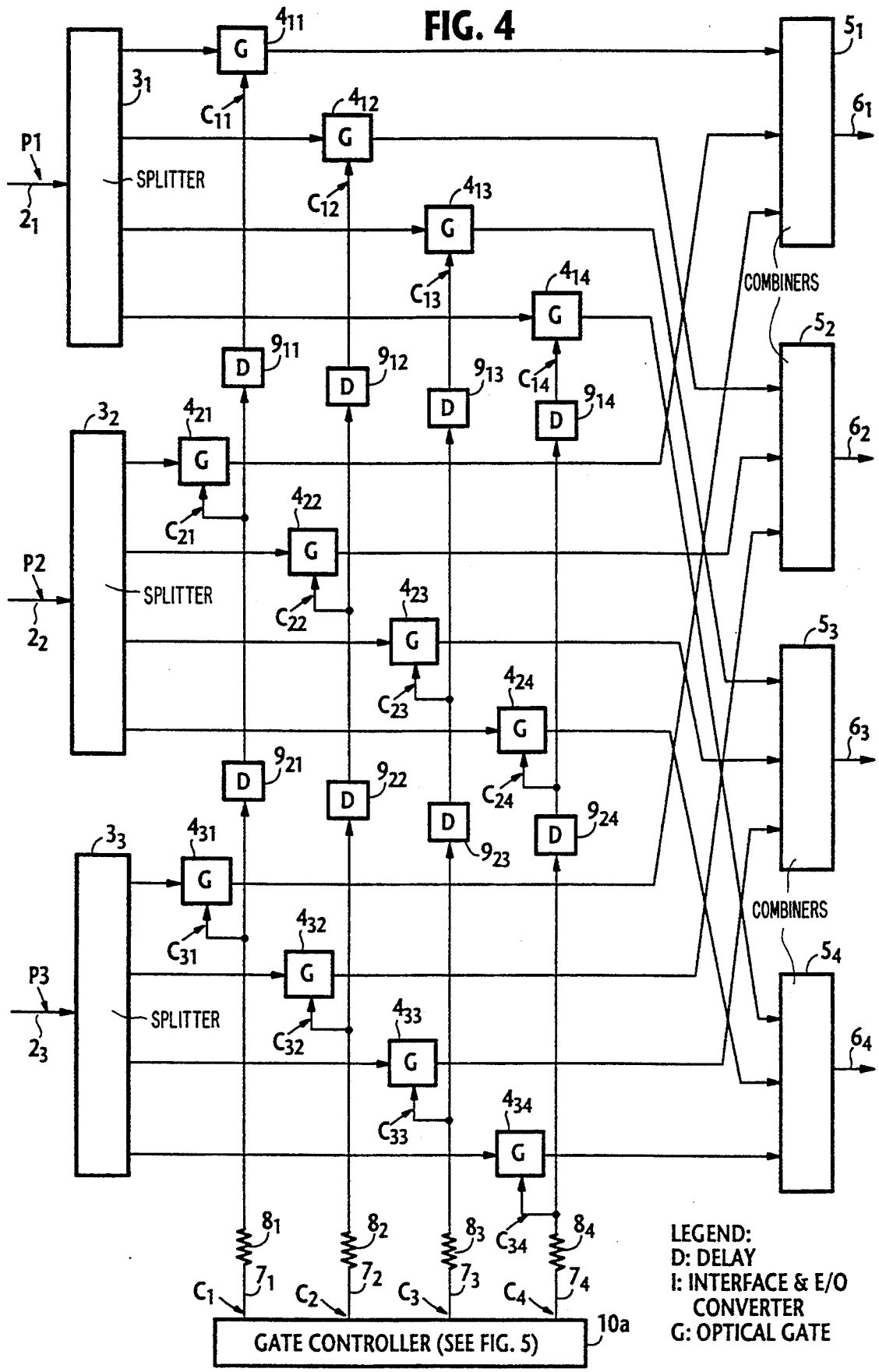
FIG. 4 is a block diagram of a second embodiment of the present invention.

A second embodiment of this invention is shown in FIG. 4 which differs from the Fig. 1 embodiment by the inclusion of a series-connected resistor-delay circuit in each of the gate control lines $7_j$ (where $j=1, 2, 3$ and 4) that extend from gate controller 10a to optical gates $4_{ij}$. Each control line $7_j$ includes a resistor $8_j$ and delay elements $9_{1j}$ and $9_{2j}$, with the circuit junction between resistor $8_1$ and delay element $9_{2j}$ being connected to optical gate $4_{3j}$ and the junction between delay elements $9_{2j}$ and $9_{1j}$ being connected to optical gate $4_{2j}$. Gate control pulses $C_j$ are successively generated at intervals T equal to the duration of the header pulse, and delayed by delay elements $9_{2j}$ and $9_{1j}$ to successively produce delayed control pulses $C_{ij}$.

Figure 5:
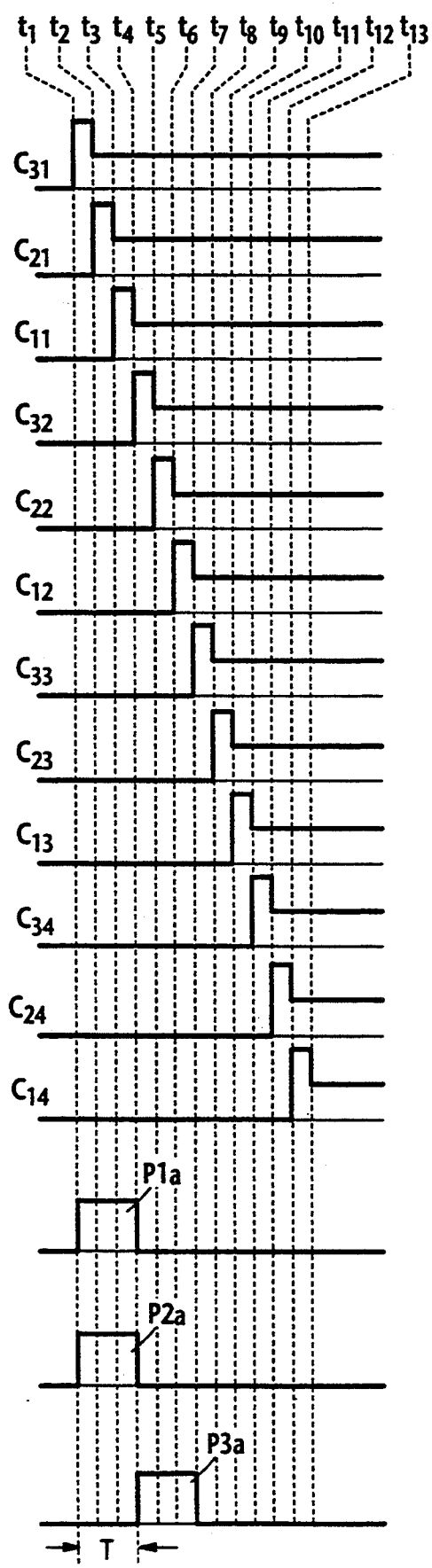
FIG. 5 is a timing diagram associated with FIG. 4.

As shown in FIG. 5, each of the delay elements 9 introduces a delay time that is one-third of the duration T of the header pulse, and the triggering voltage of each control pulse is equal to the delay time T/3. In this way, optical gates $4_{3j}$, $4_{2j}$ and $4_{1j}$ are supplied with successively shifted control pulses $C_{3j}$, $C_{2j}$ and $C_{1j}$, respectively. Therefore, each optical gate of the network of FIG. 4 has a unique triggering instant, and the header pulse of each packet successively coincides with the triggering voltage of a sequence of three control pulses. Due to the provision of the resistor $8_j$ in each column "j" of the gate array, excitation of one of the optical gates of a given column causes a voltage drop to occur across the resistor. As a result, when one of the gates of a given column is excited, the voltage applied to the other gates of the column located downstream of the excited gate are not excited even if their triggering voltages coincide with a header pulse.

Assume that packets P1 and P2 on inlet terminals $2_1$ and $2_2$ are destined to outlet terminal $6_1$ and packet P3 is destined to outlet terminal $6_2$. In order for packets P1 and P2 to arrive at outlet terminal $6_1$ and for packet P3 to arrive at terminal $6_2$, it is necessary that header pulses P1a and P2a should coincide with control pulses $C_{11}$ and $C_{21}$, respectively, and header pulse P3a should coincide with control pulse $C_{32}$ as seen from FIG. 4. Therefore, header pulses P1a and P2a are inserted to the same interval $t_1-t_4$, and header pulse P3a is inserted in the interval $t_4-t_7$ as shown in FIG. 5. If this condition occurs, a coincidence occurs in gate $4_{21}$ between header pulse P2a and the triggering voltage of pulse $C_{21}$ earlier than a coincidence that occurs in gate $4_{11}$ between header pulse P2a and the triggering voltage of pulse $C_{11}$, generating a voltage drop across resistor $8_1$ immediately following the excitation of gate $4_{21}$. Because of the voltage drop, the voltage at the gate $4_{11}$ is too low for it to be excited, while gate $4_{21}$ remains in the excited state. Packet P2 is thus allowed to pass through gate $4_{21}$ to outlet terminal $6_1$, while packet P1 is prevented from passing through gate $4_{11}$. On the other hand, header pulse P3a coincides with the triggering voltage of pulse $C_{32}$, allowing gate $4_{32}$ to transmit packet P3 to outlet terminal $6_2$. Although not shown in the drawing, some provision will be made in the network so that the fact that packet P1 corrupted as a result of a collision or contention is communicated to the originating user for retransmission of a copy of the packet. It is seen that to avoid collision between packets P1, P2 and P3 it is necessary that the header pulse of each packet exist in one of four discrete time intervals $t_1-t_4$, $t_4-t_7$, $t_7-t_{10}$ and $t_{10}-t_{13}$.

Figure 7:
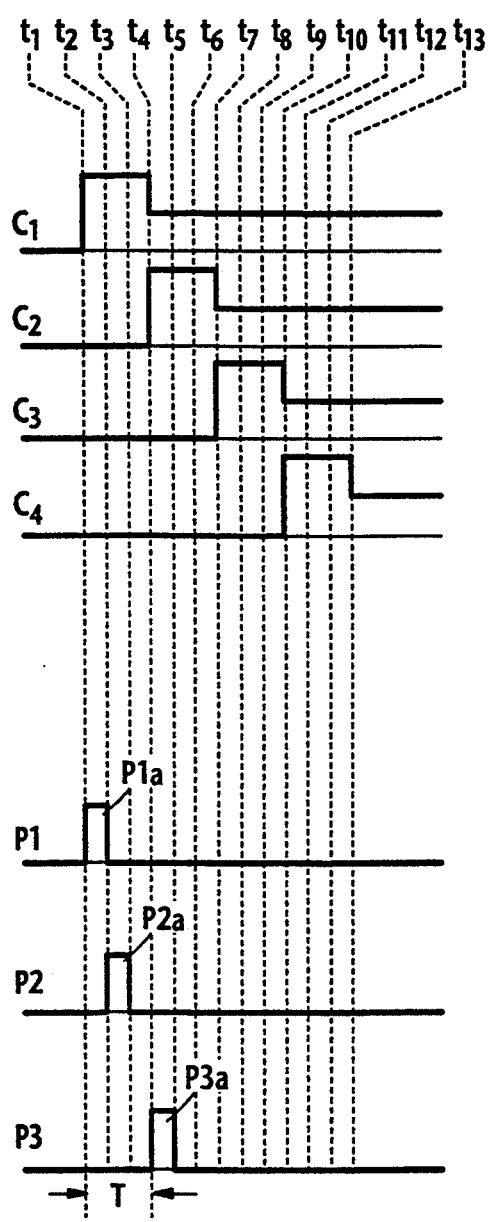
FIG. 7 is a timing diagram associated with FIG. 6.

Returning briefly to FIG. 2, if the triggering voltage of control pulse $C_1$ is delayed slightly with respect to its correct position, the successive header pulses P1a and P2a would sequentially coincide with it. This would result in a collision between packets P1 and P2 at optical gates $4_{11}$ and $4_{21}$. Such a collision is avoided by an embodiment shown in FIG. 6. The embodiment of FIG. 6 is implemented by modifying the embodiment of FIG. 4 in which all delay elements of FIG. 4 are removed from the gate array, directly coupling the voltage-dropping resistors to the associated optical gates. As shown in FIG. 7, this embodiment differs from the FIG. 4 embodiment in that the triggering voltage of each control pulse $C_j$ has a duration T, applying the same control pulse to the gates of the same column, and the header pulse of each optical packet has one-third of the duration T. Control pulses $C_1$, $C_2$, $C_3$ and $C_4$ are successively generated at T-intervals.

Assume that control pulse $C_1$ is delayed so that its triggering high voltage portion successively coincides with headers P1a and P2a (FIG. 2). However, due to the fact that the earlier occurrence of header pulse P1a generates a voltage drop across resistor $8_1$ and the voltage at the gate $4_{21}$ is lowered to a level not sufficient to cause it to excite in response to header pulse P2a. Therefore, packet P1 is passed through gate $4_{11}$, while packet P2 is blocked at gate $4_{21}$. Header pulse P3a is assumed to be assigned a position that coincides with the triggering voltage of control pulse $C_2$. Gate $4_{32}$ is thus excited, allowing packet P3 to be routed to combiner $5_2$.

A third embodiment of the present invention is shown in FIG. 8. This embodiment differs from the FIG. 1 embodiment by the inclusion of a fourth group of optical gates $4_{15} \sim 4_{18}$, a fifth group of optical gates $4_{25} \sim 4_{28}$, and a sixth group of optical gates $4_{35} \sim 4_{38}$, with the optical gates of the fourth, fifth and sixth groups being respectively connected to the outputs of the optical gates of the first, second and third groups. Controller 10c drives the optical gates of the fourth, fifth and sixth groups through control lines $7_5 \sim 7_8$ ($=7_{j+4}$, where $j=1, 2, 3$ and 4) extending to optical gates $4_{15}-4_{18}$. Each of control lines $7_{4+j}$ includes series-connected resistors $10_{1j}$, $10_{2j}$ and $10_{3j}$ with the junction between resistors $10_{1j}$ and $10_{2j}$ being connected to optical gates $4_2(j+4)$ and the junction between resistors $10_{2j}$ and $10_{3j}$ being connected to optical gates $4_{3(j+4)}$. The outputs of optical gates $4_{i(j+4)}$ are connected to the ith inputs of combiners $5_j$.

Controller 10c successively applies control pulses $C_{1a}$, $C_{2a}$, $C_{3a}$ and $C_{4a}$ to lines $7_1 \sim 7_4$, respectively, during a first interval between times $t_1$ and $t_{13}$, and successively applies additional control pulses to lines $7_5 \sim 7_8$ during a second interval between times $t_{13}$ and $t_{25}$. These additional pulses are indicated by waveforms $C_{1b}$, $C_{2b}$, $C_{3b}$ and $C_{4b}$ in FIG. 9 after experiencing a voltage drop by resisters $10_{31}$, $10_{32}$, $10_{33}$ and $10_{34}$. The triggering voltage of each of these control pulses has a duration T and the header pulse of each packet has one-third of the duration T, as in the FIG. 7 embodiment. The triggering voltages of pulses $C_{1b}$, $C_{2b}$, $C_{3b}$ and $C_{4b}$ on control lines $7_5 \sim 7_6$ has a voltage level $V_1$ after experiencing a voltage drop by resisters $10_{31}$, $10_{32}$, $10_{33}$ and $10_{34}$. When one of the optical gates connected to the same control line is excited, the voltage at the junction of resisters $10_{3j}$ and $10_{2j}$ drops to a lower level $V_2$ and the voltage at the junction of resisters $10_{2j}$ and $10_{1j}$ drops to a lowest level $V_3$. The optical gate whose triggering voltage is higher than any of the other gates of the same control line is given priority. Thus, if a contention arises in any of the fourth, fifth and sixth groups of optical gates, only one packet is selected by the gate having priority. To achieve the priority selection, each optical packet has a second header pulse "b" which is spaced from the first header pulse "a" by an interval equal to 4T. Assume that the header pulses P1$a$ and P1$b$ of optical packet P1 are inserted respectively to time slots $t_1 \sim t_2$ and $t_{14}-t_{14}$ and the header pulses P2$a$ and P3$a$ of packet P2 occur in the same time slots. The header pulses P3$a$, P3$b$ of packet P3 are assumed to be inserted to positions $t_4 \sim t_5$ and $t_{16}-t_{17}$. Since header pulses P1$a$ and P2$a$ coincide with the triggering voltage of control pulse $C_{1a}$, optical gates $4_{11}$ and $4_{21}$ are simultaneously excited, allowing packets P1 and P2 to be forwarded to optical gates $4_{15}$ and $4_{25}$, respectively, while header pulse P3$a$ excites gate $4_{32}$ upon coincidence with the triggering voltage of control pulse $C_{2a}$, thus applying packet P3 to gate $4_{36}$. Header pulse P1$b$ coincides with the triggering voltage of control pulse $C''_{1b}$ that is applied to gate $4_{15}$, and the header pulse P2$b$ coincides with the triggering voltage of control pulse $C'_{1b}$ that is applied to gate $4_{25}$. Therefore, the triggering voltage at gate $4_{25}$ reduces to lower level $V_2$, while the voltage at gate $4_{15}$ reduces lowest level $V_3$ as indicated in FIG. 9, giving priority to gate $4_{25}$ in passing packet P2 to combiner $5_1$. Header pulse P3$b$ then coincides with the triggering voltage of control pulse $C_{2b}$ at gate $4_{36}$, and packet P3 is passed through it to combiner $5_2$.

A modified embodiment of FIG. 8 is shown in FIG. 10 which differs from it by the exclusion of resistors $10_{1j}$ and $10_{2j}$ from the control lines $7_{(j+4)}$ and by the use of second header pulses having different light intensities $S_1$, $S_2$ and $S_3$ as shown in FIG. 11, with the light intensities having a relationship $S_1 > S_2 > S_3$. Assume that all header pulses of packets P1, P2 and P3 are inserted to the same time slots as in the FIG. 8 embodiment, and that their second header pulses P1$b$, P2$b$ and P3$b$ have light intensities $S_1$, $S_2$ and $S_3$, respectively. In the same manner as described in the previous embodiment, packets P1, P2 and P3 are passed through optical gates $4_{11}$, $4_{21}$ and $4_{32}$, respectively, when their first header pulses P1$a$, P2$a$, P3$a$ coincide with control pulses $C_{1a}$ and $C_{2a}$ and are directed to optical gates $4_{15}$, $4_{25}$, and $4_{36}$, respectively. Because of the highest light intensity of header pulse P1$b$, coincidence between header pulse P1$a$ and control pulse $C_{1b}$ causes gate $4_{15}$ to draw a greater current for excitation than the current drawn by gate $4_{25}$. A sharp voltage drop thus develops across resistor $10_{31}$, preventing gate $4_{25}$ from being excited. Thus, packet P1 is given priority over contending packet P2, while packet P3 is allowed to pass through gate $4_{36}$ to combiner $5_2$ without contention in response to its second header pulse coinciding with control pulse $C_{2b}$.

Figure 12:
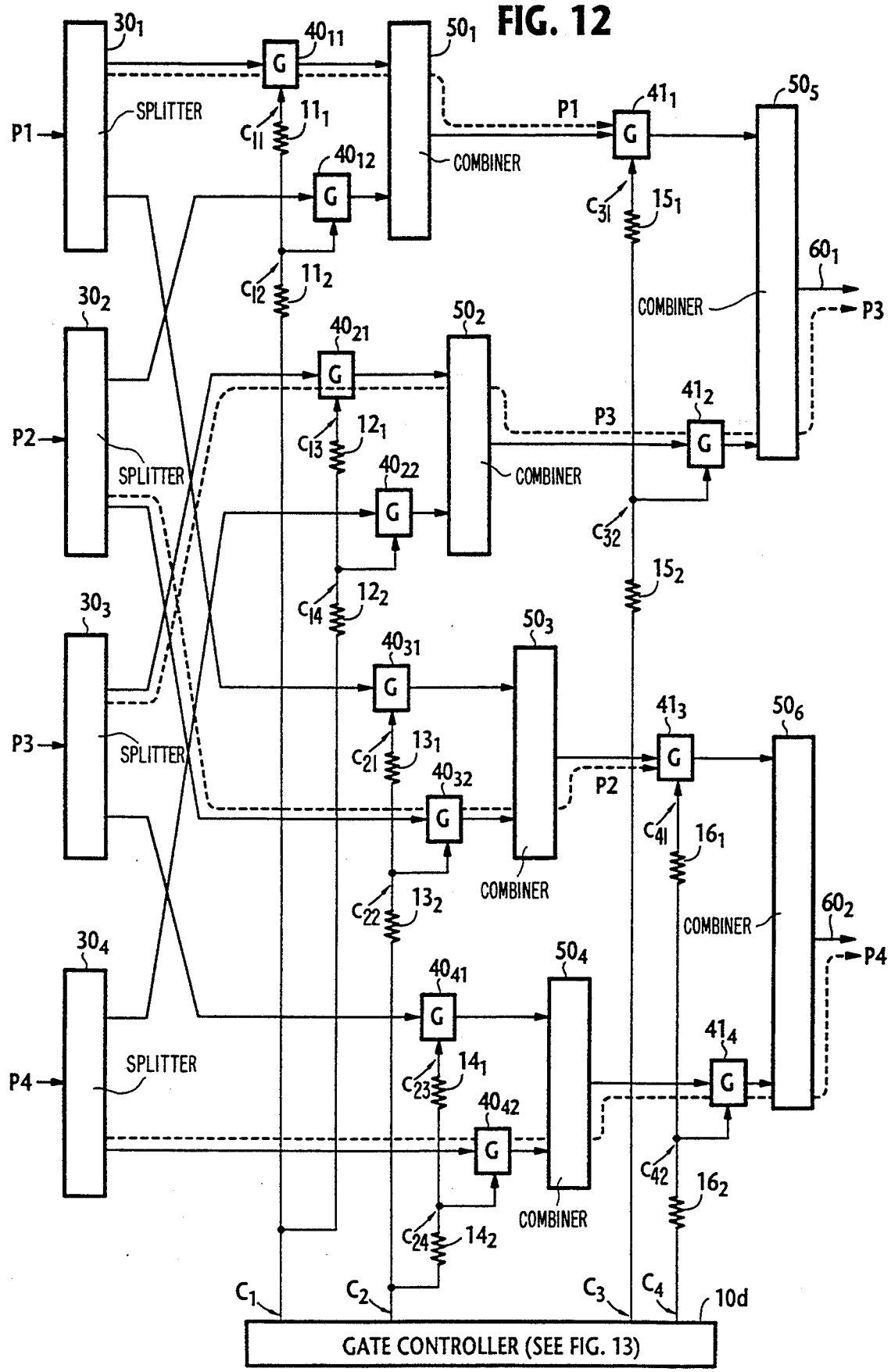
FIG. 12 is a block diagram of a fourth embodiment of this invention.

A fourth embodiment of this invention is shown in FIG. 12 as a 4×2 switch configuration. Four optical splitters $3_1 \sim 3_4$, each having two outputs, are provided to receive incoming optical packets P1, P2, P3 and P4, respectively. Optical gates $40_{1n}$ (where n=1 and 2) have their inputs coupled respectively to the first (upper) outputs of splitters $30_1$ and $30_2$, and optical gates $40_{2n}$ have their inputs coupled respectively to the first outputs of splitters $30_3$ and $30_4$. Similarly, optical gates $40_{3n}$ have their inputs coupled respectively to the second (lower) outputs of splitters $30_1$ and $30_2$, and optical gates $40_{4n}$ have their inputs coupled respectively to the second outputs of splitters $30_3$ and $30_4$. Optical combiners $50_m$ (where m=1, 2, 3 and 4) are associated respectively with optical gates $40_{mm}$. Each combiner $50_m$ has two inputs which are connected to the outputs of the associated optical gates $4_{mm}$. The outputs of combiners $50_m$ are connected respectively to optical gates $41_m$. The outputs of gates $41_1$ and $41_2$ are respectively coupled by optical combiner $50_5$ to outlet terminal $60_1$, those of gates $41_3$ and $41_4$ being coupled by combiner $50_6$ to outlet terminal $60_2$.

Gate controller $10d$ generates four control pulses $C_1$, $C_2$, $C_3$ and $C_4$. Control pulse $C_1$ is supplied to gate $40_{11}$ through resistors $11_2$ and $11_1$ and to gate $40_{12}$ through resistor $11_2$, the same pulse being applied to gate $40_{21}$ through resistors $12_2$ and $12_1$ and to gate $40_{22}$ through resistor $12_2$, thus supplying different voltages $C_{11}$, $C_{12}$, $C_{13}$ and $C_{14}$ to gates $40_{11}$, $40_{12}$, $40_{21}$ and $40_{22}$, respectively. Likewise, control pulse $C_2$ is supplied to gate $40_{31}$ through resistors $13_2$ and $13_1$ and to gate $40_{32}$ through resistor $13_2$, the same pulse being applied to gate $40_{41}$ through resistors $14_2$ and $14_1$ and to gate $40_{42}$ through resistor $14_2$, thus supplying different voltages $C_{21}$, $C_{22}$, $C_{23}$ and $C_{24}$ to gates $40_{31}$, $40_{32}$, $40_{41}$ and $40_{42}$, respectively. In like manner, control pulse $C_3$ is applied to gate $41_1$ through resistors $15_2$ and $15_1$ and to gate $41_2$ through resistor $15_2$, and control pulse $C_4$ is applied to gate $41_3$ through resistors $16_2$ and $16_1$ and to gate $41_2$ through resistor $16_2$, thus supplying different voltages $C_{31}$, $C_{32}$, $C_{41}$ and $C_{42}$ to gates $41_1$, $41_2$, $41_3$ and $41_4$, respectively. It is seen that gates $40_{12}$, $40_{22}$, $40_{32}$, $40_{42}$, $41_2$ and $41_4$ are given priority over their companion gates $40_{11}$, $40_{21}$, $40_{32}$, $40_{41}$, $41_1$ and $41_3$, when coincidence occurs between incoming header pulses and their gate control pukes. The self-routing network of this configuration can be said to operate on a successive "tournament" basis as will be understood with reference to FIG. 13. As shown in FIG. 13, the triggering voltage of each control pulse has a duration T equal to the duration of each header pulse. Timing margins are provided between the leading edges of successive gate control pulses. For purposes of clarity, the timing margins are set equal to the duration T. Assume that a contention is likely to occur between the header pulses P1$b$ and P3$b$ of packets P1 and P3 and between the header pulse P2$b$ and P4$b$ of packets P2 and P4. The header pulse P1$a$ of packet P1 coincides with control pulse $C_{11}$ at gate $40_{11}$ without contention with gate $40_{12}$, allowing the packet to be routed through combiner $50_1$ to output gate $41_1$, while the header pulse P3$a$ of packet P3 coincides with control pulse $C_{13}$ at gate $40_{21}$ without contention with gate $40_{22}$, routing the packet through combiner $50_2$ to output gate $41_2$. In like manner, the header pulse P2$a$ of packet P2 coincide with control pulse $C_{22}$ at gate $40_{32}$ without contention with gate $40_{31}$, allowing the packet to be routed through combiner $50_3$ to output gate $41_3$, while the header purse P4$a$ of packet P4 coincides with control pulse $C_{24}$ at gate $40_{42}$ without contention with gate $40_{41}$, muting the packet through combiner $50_4$ to output gate $41_4$.

Contention occurs between the header pulses P1$b$ and P3$b$ at gates $41_1$ and $41_2$ as they are simultaneously supplied with the triggering voltages of control pulses $C_{31}$ and $C_{32}$. Since control pulse $C_{32}$ has a higher triggering voltage than control pulse $C_{31}$, Gate $41_2$ wins the contention, passing packet P3 through combiner $50_5$ to outlet terminal $60_1$. A similar situation occurs between the header pulses P2$b$ and P4$b$ at gates $41_3$ and $41_4$, as they are simultaneously supplied with the triggering voltages of control pulses $C_{41}$ and $C_{42}$. Because of the higher triggering voltage, gate $41_4$ wins the contention for transmitting packet P4 to outlet terminal $60_2$. If a contention occurs between input gates $40_{i1}$ and $40_{i2}$ (where $i=1, 2, 3, 4$), gate $40_{i2}$ is always the winner by virtue of their higher triggering voltage.

Figure 14:
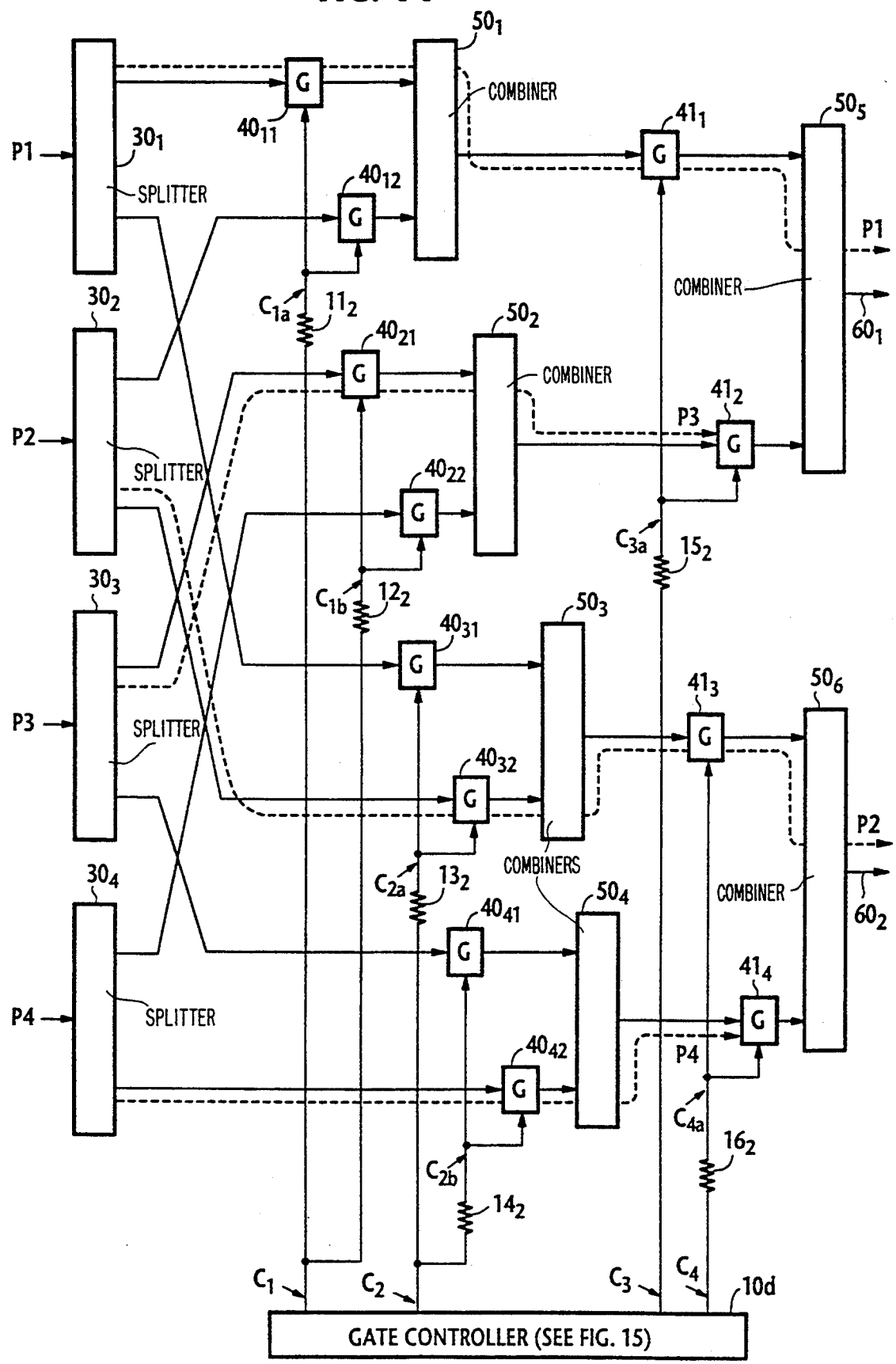
FIG. 14 is a block diagram of a modified form of the fourth embodiment.
Figure 15:
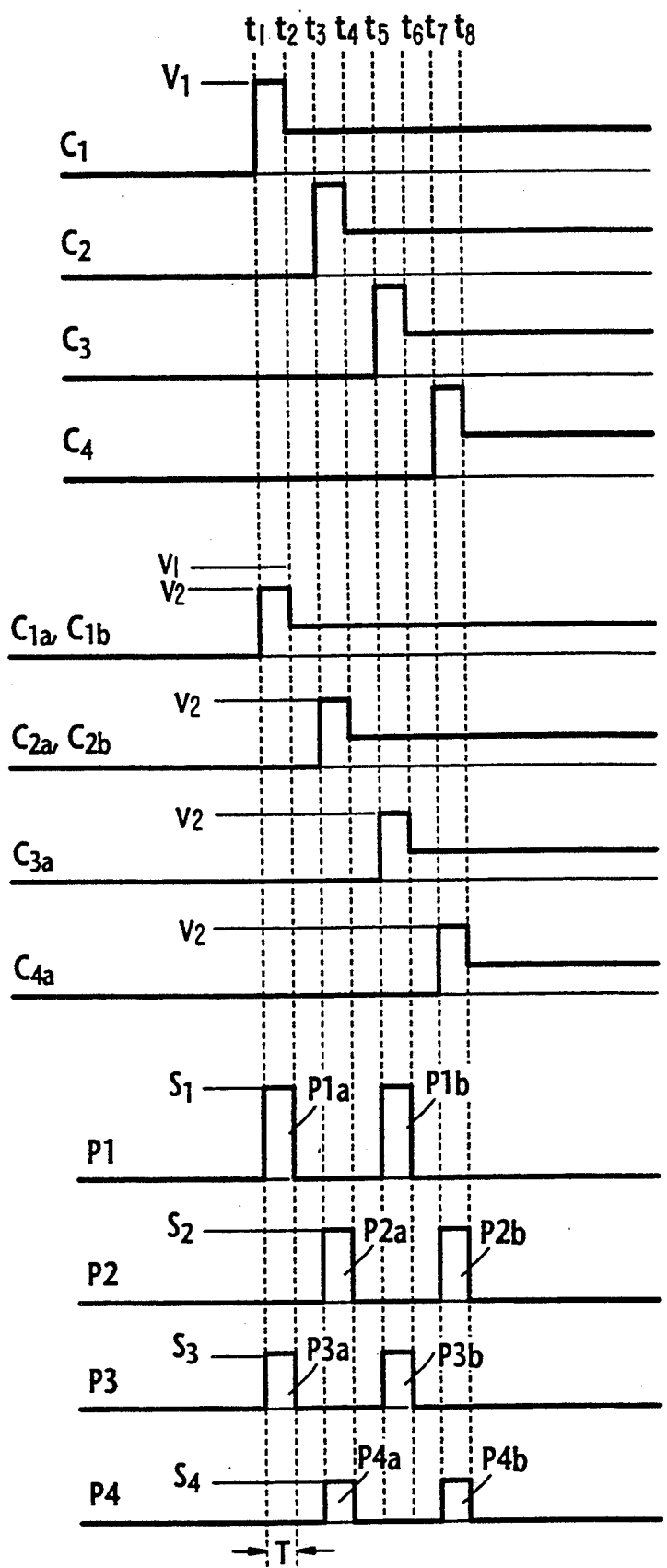
FIG. 15 is a timing diagram associated with FIG. 14.
Figure 16:
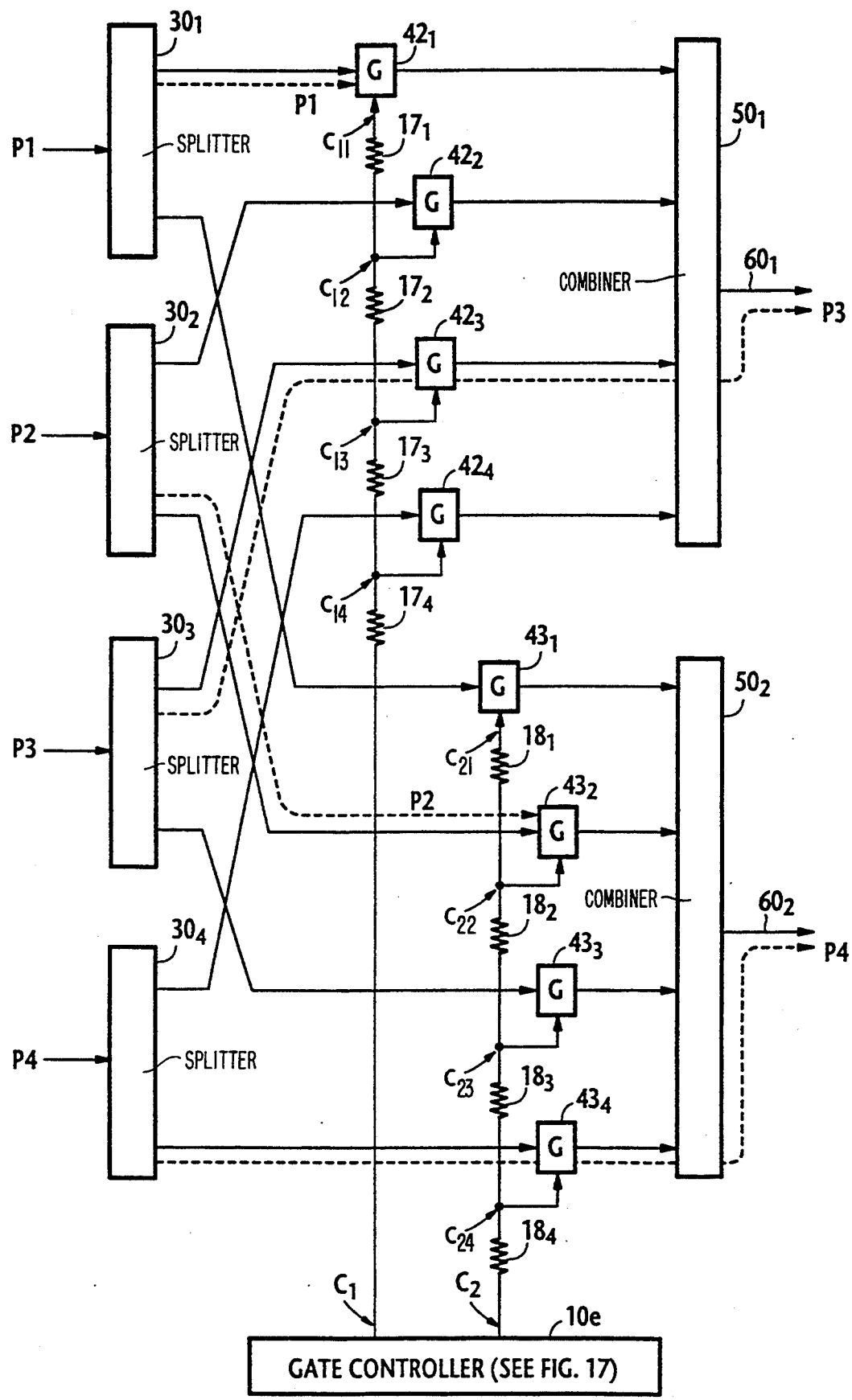
FIG. 16 is a block diagram of a fifth embodiment of this invention.

An embodiment shown in FIG. 14 is a modification of the embodiment of FIG. 12, the difference being in the exclusion of resistors $11_1$, $12_1$, $13_1$, $14_1$, $15_1$ and $16_1$ so that equal triggering voltages ($C_{1a}$, $C_{1b}$, $C_{2a}$, $C_{2b}$, $C_{3a}$, $C_{4a}$) are supplied to the optical gates of contending partners (pairs) and in the generation of header pulses having different light intensities as seen from FIG. 15. As illustrated, the header pulses are assumed to occur in the same time slots as in the case of FIG. 14. As in the previous embodiment, packets P1 and P3 are routed through input gates without contention to output gates $41_1$ and $41_2$ between which contention arises, and the other packets are routed to output gates $41_3$ and $41_4$ between which contention arises. The header pulses of packet P1 have the highest light intensity, and those of packets P2, P3 and P4 have decreasing light intensities in the order given. Since header pulses P1$b$ and P2$b$ have a higher light intensity than those of the contending packets, packets routed to output gates $41_1$ and $41_3$ are the winners of the contentions, so that P1 is passed through combiner $50_5$ to outlet terminal $60_1$ and P2 is passed through combiner $50_6$ to outlet terminal $60_2$. A self-routing network of a $4\times 2$ switch configuration can also be implemented in a single contention stage for each outlet terminal as shown in FIG. 16. Optical gates $42_1 \sim 42_4$ are coupled respectively to the first outputs of splitters $30_1 \sim 30_4$ for resolving a contention among packets destined to outlet terminal $60_1$ through combiner $50_1$, and optical gates $43_1$–$43_4$ are coupled respectively to the second outputs of splitters $30_1 \sim 30_4$ for resolving a contention among packets that are destined for outlet terminal $60_2$ through combiner $50_2$. Gate controller $10e$ supplies a control pulse $C_1$ through series-connected resistors $17_4$, $17_3$, $17_2$ and $17_1$ to develop successively decreasing control voltages $C_{14}$, $C_{13}$, $C_{12}$ and $C_{11}$ for coupling to gates $42_4$, $42_3$, $42_2$ and $42_1$, respectively. Likewise, gate controller $10e$ further supplies a control pulse $C_2$ through series-connected resistors $18_4$, $18_3$, $18_2$ and $18_1$ to develop successively decreasing control voltages $C_{24}$, $C_{23}$, $C_{22}$ and $C_{21}$ for coupling to gates $43_4$, $43_3$, $43_2$ and $43_1$, respectively.

Figure 18:
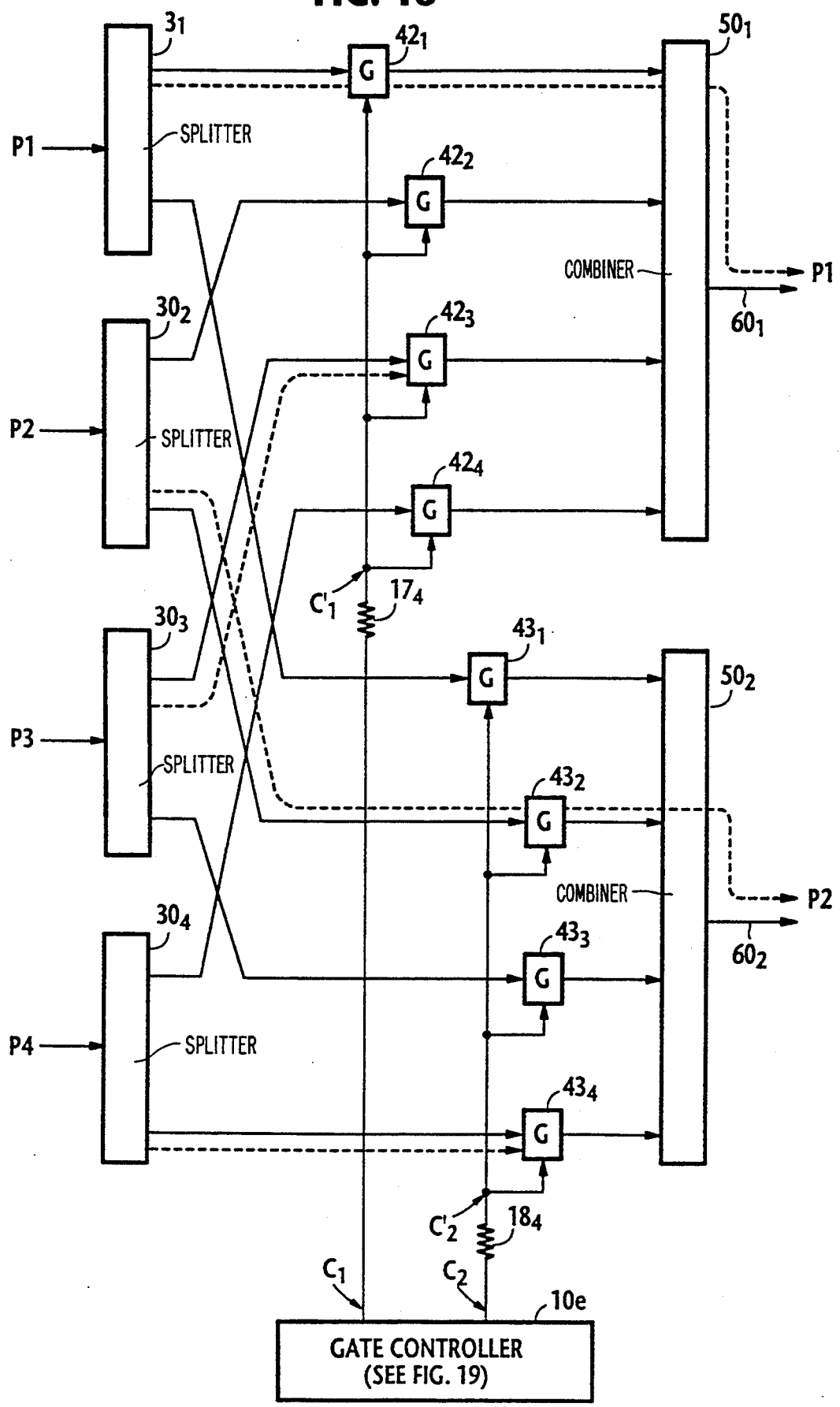
FIG. 18 is a block diagram of a modified form of the fifth embodiment.
Figure 19:
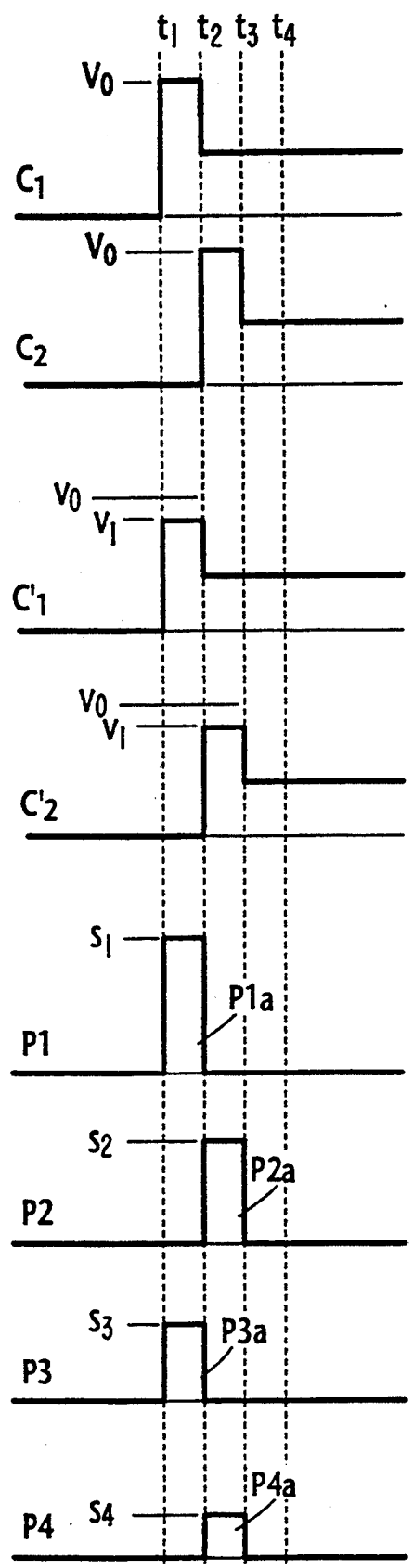
FIG. 19 is a timing diagram associated with FIG. 18.

As shown in FIG. 17, each optical packet has a single header pulse. If header pulse P1$a$ and P3$a$ occur in the same time slot $t_1$–$t_2$ so that packets P1 and P3 are destined to outlet terminal $60_1$ and header pulse P2$a$ and P4$a$ occur in the same time slot $t_2$–$t_3$ so that packets P2 and P4 are destined to outlet terminal $60_2$, contention occurs at gates $42_1$ and $42_3$ as well as at gates $43_2$ and $43_4$ as packets P1 and P3 coincide with control pulses $C_{11}$ and $C_{13}$, respectively, and the other packets P2 and P4 coincide with control pulses $C_{22}$ and $C_{24}$, respectively. Since gate $42_3$ is supplied with a higher triggering voltage than the voltage supplied to gate $42_1$, packet P3 wins the race for contention with packet P1. In a similar manner, if gate $43_4$ is supplied with a higher triggering voltage than the voltage at gate $43_1$, packet P4 is the winner. FIG. 18 is a modification of the embodiment of FIG. 16, the difference being the exclusion of resistors $17_1$–$17_3$ and resistors $18_1$–$18_3$, so that equal triggering voltages ($C'_1$ and $C'_2$) are supplied to the optical gates of contending partners (sets) and in the generation of header pulses having different light intensities, as seen from FIG. 19. As illustrated, the header pulses are assumed to occur in the same time slots as in the case of FIG. 17. As in the previous embodiment, packets P1 and P3 are applied to gates $42_1$ and $42_3$, respectively, and packets P2 and P4 are applied to gates $43_2$ and $43_4$, respectively. As shown in FIG. 19, the header puke of packet P1 have the highest light intensity, and those of packets P2, P3 and P4 have decreasing light intensities in the order given. Since header pulses P1$b$ and P2$b$ have a higher light intensity than those of the contending packets, packets P1 and P2 supplied to gates $42_1$ and $43_2$ are the winners of the race to respective outlet terminals $60_1$ and $60_2$.

Figure 20:
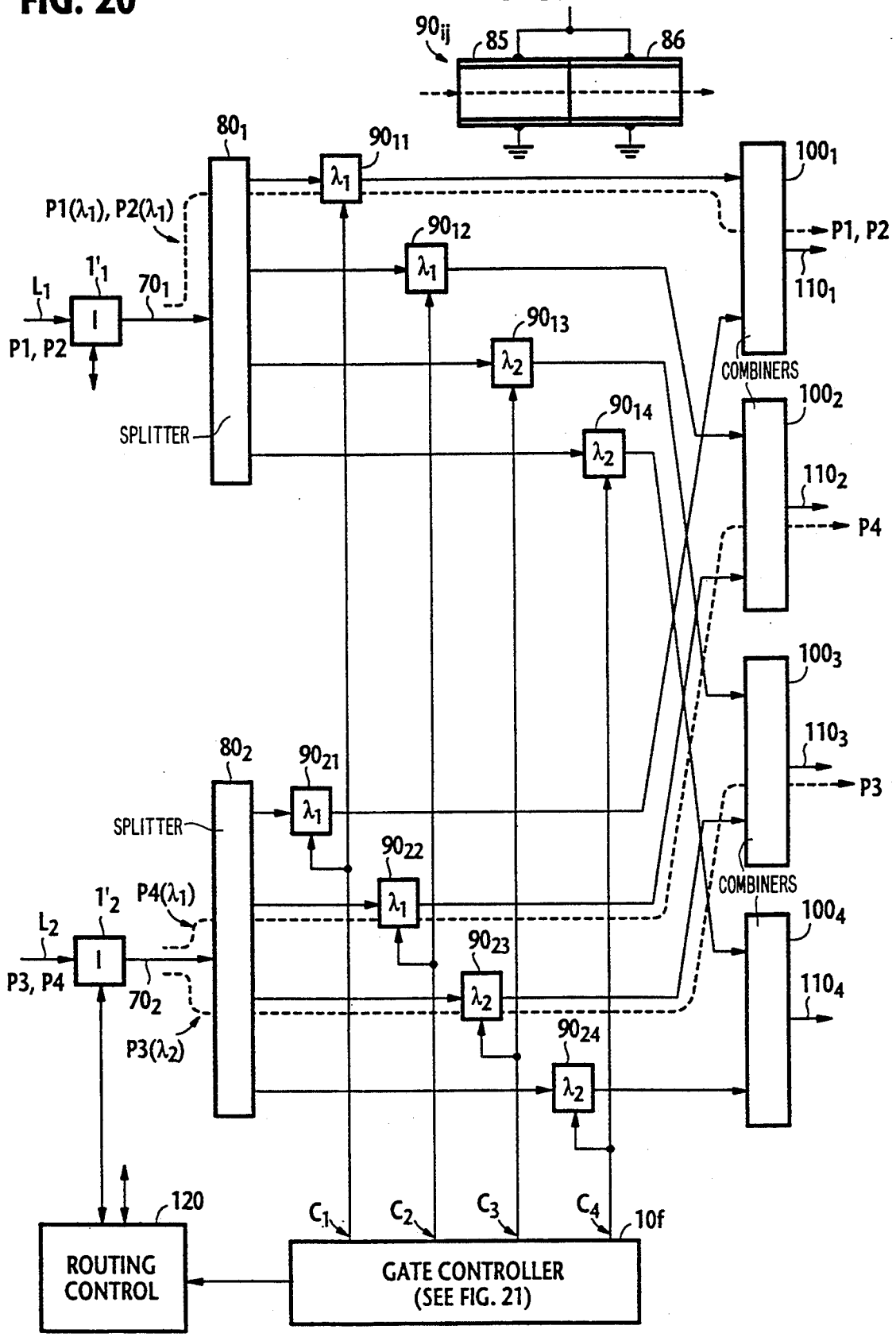
FIG. 20 is a block diagram of a sixth embodiment of the present invention, FIG. 20A showing details of the optical gates of FIG. 20.

The length of a header increases with the amount of traffic to be carried by the self-routing network. The header length can be conserved by multiplexing optical packets upon different light wavelengths. The wavelength multiplexing concept of this invention for two wavelengths is implemented by a $2\times 4$ network configuration as shown in FIG. 20. Electrical packets P1 and P2 from a user station are successively transmitted on access line $L_1$ and received by line interface $1'_1$ and packets P3 and P4 from another user station are successively transmitted on access line $L_2$ and received by line interface $1'_2$. Routing controller 120 is coupled to the line interfaces, determines a wavelength and a header time slot according to the information contained in a packet received from the associated interface in relation to the timing and amplitude pattern of the gate control pulses supplied from gate controller $10f$, and instructs the interface to carry the packet on the determined wavelength and insert a header pulse into the determined time slot. For purposes of illustration, packets P1 and P2 are converted by line interface $1'_1$ to optical signals of wavelength $\lambda_1$, and packets P3 and P4 are converted by line interface $1'_2$ to optical signals of wavelengths $\lambda_2$ and $\lambda_1$, respectively. The outputs of interfaces $1'_1$ and $1'_2$ are connected respectively by light waveguides $70_1$ and $70_2$ to optical splitters $80_1$ and $80_2$, each having four outputs. Optical gates $90_{11}$, $90_{12}$, $90_{13}$ and $90_{14}$ are connected respectively to the outputs of splitter $80_1$, and gates $90_{11}$ and $90_{12}$ are tuned to wavelength $\lambda_1$, and gates $90_{13}$ and $90_{14}$ are tuned to wavelength $\lambda_2$. Optical gates $90_{21}$, $90_{22}$, $90_{23}$ and $90_{24}$ are likewise connected to the outputs of splitter $80_2$, with gates $90_{21}$ and $90_{22}$ being tuned to wavelength $\lambda_1$ and gates $90_{23}$ and $90_{24}$ being tuned to wavelength $\lambda_2$. The outputs of gates $90_{ij}$ ($I=1, 2, 3, 4$) are connected respectively to the first inputs of combiners $100j$ and the outputs of gates $90_{2j}$ are connected to the second inputs of combiners $100j$. Gate controller $10f$ supplies control pulses $C_1$ and $C_2$ to gates $90_{i1}$ and $90_{i2}$ ($i=1, 2$) and control pulses $C_3$ and $C_4$ to gates $90_{i3}$ and $90_{i4}$.

As shown in FIG. 20A, each of the optical gates $90_{ij}$ is preferably constructed of a narrow-band wavelength tunable optical element 85 and a wide-band wavelength tunable optical element 86 coupled together and arranged in the path of incident light beam.

Figure 21:
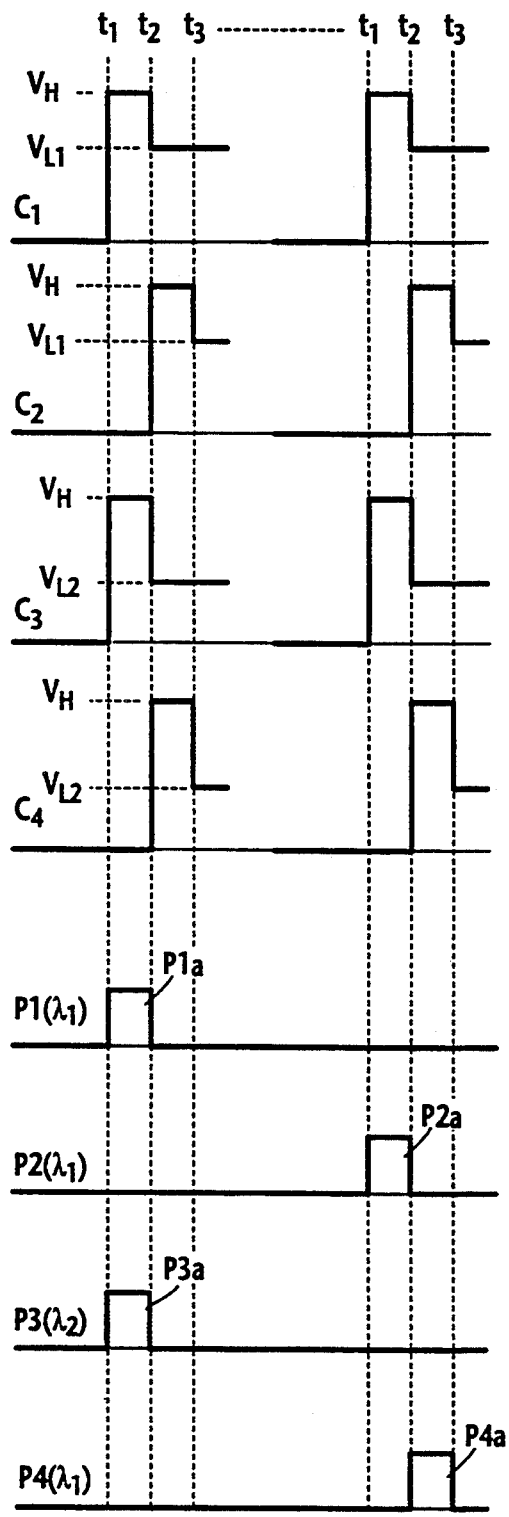
FIG. 21 is a timing diagram associated with FIG. 20.

As illustrated in FIG. 21, the triggering voltages of all control pulses $C_1 \sim C_4$ have equal amplitude $V_H$ for gate excitation, with the triggering voltages of pulses $C_1$ and $C_3$ having an equal time slot $t_1$–$t_2$ and those of pulses $C_2$ and $C_4$ having an equal time slot $t_2$–$t_3$. According to different wavelengths, control pulses $C_1$ and $C_2$ have a trailing voltage $V_{L1}$ for tuning to wavelength $\lambda_1$, while the trailing voltage of pulses $C_3$ and $C_4$ is set equal to $V_{L2}$ for tuning to wavelength $\lambda_2$.

Assume that header pulses P1$a$ and P2$a$ for packets P1 ($\lambda_1$) and P2($\lambda_1$) are inserted into the same time slot $t_1$–$t_2$ of successive headers and the header pulse P3$a$ of packet P3($\lambda_2$) is inserted to the time slot $t_1$–$t_2$ of an initial header. The header pulse P4$a$ of packet P4($\lambda_1$) is assumed to be inserted in the time slot $t_2$–$t_3$ of a subsequent header.

It is seen that header pulses P1a and P2a successively coincide with control pulse $C_1$ at gate $90_{11}$, so packets $P1(\lambda_1)$ and $P2(\lambda_1)$ are routed to an outlet terminal $110_1$ via combiner $100_1$. Header pulse P3a coincides with control pulse $C_3$ at gate $90_{23}$, allowing packet $P3(\lambda_2)$ to be routed to outlet terminal $110_3$ via combiner $100_3$. In like manner, header pulse P4a coincides with control pulse $C_2$ at gate $90_{22}$, muting packet $P4(\lambda_1)$ to outlet terminal $110_2$ via combiner $100_2$.

Figure 22:
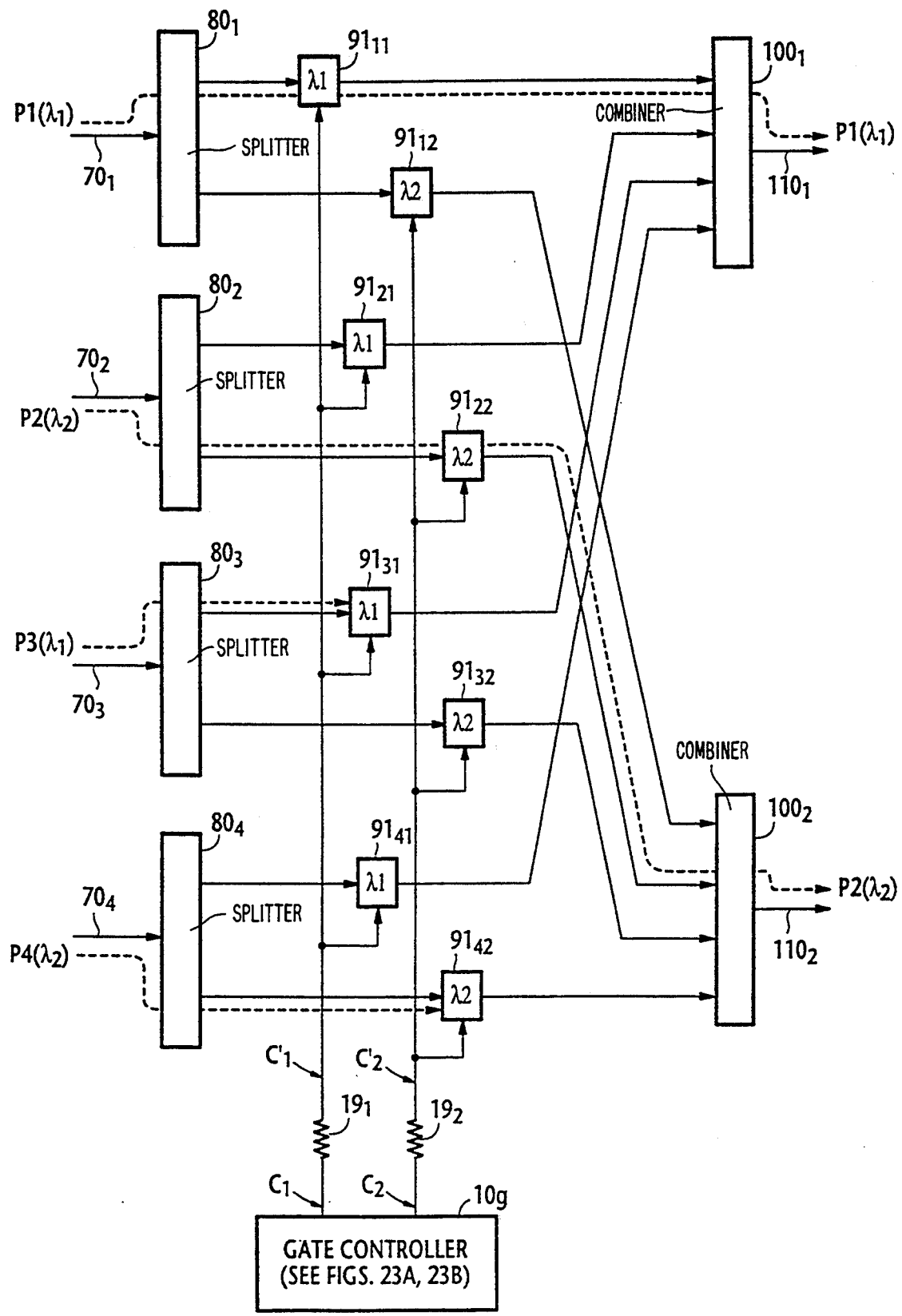
FIG. 22 is a block diagram of a modification of the sixth embodiment of the present invention.

However, data collision is likely to occur between packets of the same wavelength at the inputs of a combiner 100 if their header pulses are inserted to successive time slots of the same header and partially coincide with a control pulse due to timing inaccuracies. To resolve the collision problem, the embodiment of FIG. 20 is modified as shown in FIG. 22 in which the network is implemented in a 4×2 switch configuration. Optical splitters $80_1$, $80_2$, $80_3$ and $80_4$, arranged to receive optical packets $P1(\lambda_1)$, $P2(\lambda_2)$, $P3(\lambda_1)$ and $P4(\lambda_2)$ from waveguides $70_1 \sim 70_4$, are connected respectively to wavelength tunable optical gates $91_{1j}$, $91_{2j}$, $91_{3j}$ and $91_{4j}$ ($i = 1, 2$). The outputs of gates $91_{i1}$ and $91_{i2}$ ($i = 1, 2, 3, 4$) are coupled to the ith inputs of combiners $100_1$ and $100_2$. Gates $91_{i1}$ and $91_{i2}$ are tuned to wavelength $\lambda_1$ and $\lambda_2$, respectively, and supplied with control pulses $C'_1$ and $C'_2$ via resistors $19_1$ and $19_2$, respectively, from gate controller 10g.

Figure 23A:
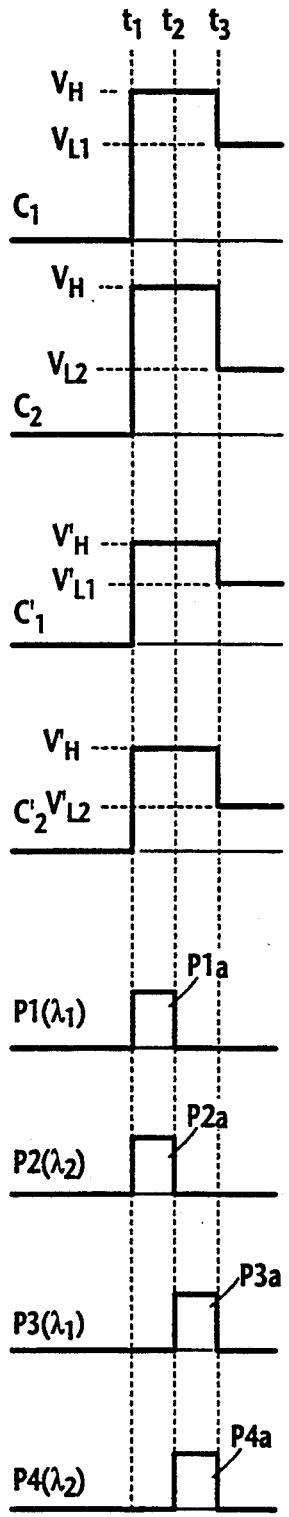
FIGS. 23A and 23B are timing diagrams associated with FIG. 22.

As shown in FIG. 23A, gate control pulses $C_1$ and $C_2$ generated by controller 10g have triggering voltages of a duration twice as long as the duration of the header pulse. Assume that header pulses P1a and P2a are inserted to time slot $t_1$–$t_2$, and header pulses P3a and P4a are assigned time slot $t_2$–$t_3$. It is seen that gate $91_{11}$ is excited upon coincidence between header pulse P1a and control pulse $C'_1$, producing a voltage drop across resistor $19_1$ and allowing packet $P1(\lambda_1)$ to be routed to combiner $100_1$. Similarly, gate $91_{22}$ is excited upon coincidence between header pulse P2a and control pulse $C'_2$, producing a voltage drop across resistor $19_2$ and allowing packet $P2(\lambda_2)$ to be routed to combiner $100_2$. However, due to the voltage drop across resistor $19_1$, gate $91_{31}$ is not excited and packet $P3(\lambda_1)$ is the loser of the contention with packet $P1(\lambda_1)$. In like manner, packet $P4(\lambda 2)$ is the loser of the contention with packet $P2(\lambda_2)$.

Figure 23B:
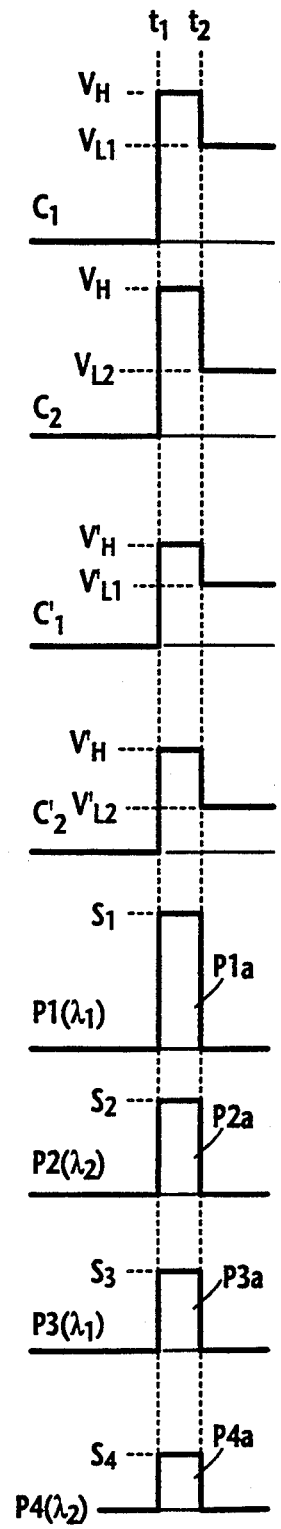

Alteratively, the triggering voltages of all control pulses are of equal duration to the duration of the header pulse and the header of each packet has different light intensities as shown in FIG. 23B. In this way, packets P1~P4 have decreasing levels of priority in the order named that contention between packets P1 and P3 at gates $91_{11}$ and $91_{31}$ is resolved by giving priority to packet P1, while contention between packets P2 and P4 is resolved by giving priority to packet P2.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An optical self-routing network for self-routing an optical packet having a header, comprising:

N optical splitters associated respectively with N inlet terminals of the network, each of the splitters receiving an optical packet incident from the associated inlet terminal and splitting the incident optical packet into M replicas of the optical packet;

M optical combiners associated respectively with M outlet terminals of the network, each of the optical combiners receiving N optical packets incident thereon and combining the incident optical packets into a combined optical signal and coupling the combined optical signal to the associated outlet terminal;

a plurality of optical gates divided into M sets corresponding respectively to the M optical combiners, each optical gates establishing a path between input and output ends thereof upon time coincidence between light energy and electrical energy applied thereto, each of the M sets comprising N optical gates corresponding respectively to the N optical splitters, the optical gates of each set being respectively connected at input ends thereof to the corresponding N optical splitters and connected at output ends thereof to the M optical combiner to which the set of the optical gates corresponds, each optical gate of each set receiving one of M replicas of an optical packet incident from the corresponding optical splitter and allowing passage of the incident replica and said electrical energy; and gate control means for supplying a gate control electrical signal of a predetermined waveform to the optical gates of each set during M successive intervals as said electrical energy.

2. An optical self-routing network as claimed in claim 1, wherein said gate control means includes priority selection means for selecting one of optical packets incident on the optical gates of each set when contention arises among said optical packets.

3. An optical self-routing network as claimed in claim 1, wherein said gate control means supplies successively shifted gate control electrical signals of predetermined waveforms respectively to the optical gates of each set as said electrical energy so that one of the optical packet incident thereon when the gate control electrical signal applied thereto is the earliest of the gate control electric signals which are successively applied to the optical gates of said given set.

4. An optical self-routing network as claimed in claim 1, wherein the optical gates of each set are commonly assigned a unique time interval, wherein those of said optical packets which are supplied to said N optical gates of each set are successively shifted during said unique time interval, and wherein said gate control means exclusively causes one of the optical gates of each set to allow passage of an optical packet incident thereon when the header of the incident optical packet is the earliest of the headers of the optical packets incident on the optical gates of the set.

5. An optical self-routing network as claimed in claim 1, wherein said gate control means simultaneously supplies gate control electrical signals of predetermined amplitudes respectively to the optical gates of each set as said electrical energy so that one of the optical gates of a given set exclusively allows passage of an optical packet incident thereon when the amplitude of the gate control electrical signal applied thereto is the highest of the electrical signals applied to the optical gates of the given set.

6. An optical self-routing network as claimed in claim 1, wherein said gate control means simultaneously supplies gate control electrical signals of predetermined amplitudes respectively to the optical gates of each set as said electrical energy so that one of the optical gates of a given set exclusively allows passage of an optical packet incident thereon when the light intensity of the header of the incident optical packet incident on the optical gates of the given set.

7. An optical self-routing network for self-routing an optical packet having a first and a second header, comprising:

N optical splitters associated respectively with N inlet terminals of the network, each of the splitters splitting an optical packet from the associated inlet terminal into M replicas of the optical packet;

M optical combiners associated respectively with M outlet terminals of the network, each of the optical combiners combining N optical packets incident thereon into a combined optical signal and coupling the combined optical signal to the associated outlet terminal;

first and second arrays of optical gates, each optical gate establishing a path between input and output ends thereof upon time coincidence between light energy and electrical energy applied thereto, the first array being divided into M sets of N optical gates each, the N optical gates of each set being connected respectively at input ends thereof to the N optical splitters, each optical gate of each sat receiving one of M replicas of an optical packet incident from the corresponding optical splitter and allowing passage of the incident replica therethrough upon time coincidence between the first header of the incident replica and first electrical energy;

the second array being divided into M sets of N optical gates each, the M sets of the second array corresponding respectively to the M optical combiners, and the N optical gates of each set being connected at inputs ends thereof respectively to the N optical gates of each set of the first array and connected at output ends thereof to the optical combiner to which the set of the optical gates corresponds, each optical gate of the second array receiving an optical packet incident from the first array and allowing passage of the incident optical packet therethrough upon time coincidence between the second header of the incident packet and second electrical energy; and gate control means for supplying a gate control electrical of a predetermined waveform to each set of optical gates of the first array during M successive intervals as said first electrical energy, subsequently simultaneously supplying N gate control electrical signals of predetermined amplitudes respectively to the optical gates of each set of the second array during M successive intervals as said second electrical energy so that one of the N optical gates of a given set of the second array exclusively allows passage of an optical packet incident thereon when the amplitude of the gate control electrical signal applied thereto is the highest of the gate control electrical signals applied to the N optical gates of said given set.

8. An optical self-routing network for self-routing an optical packet having a first and a second header, comprising:

N optical splitters associated respectively with N inlet terminals of the network, each of the splitters receiving an optical packet incident from the associated inlet terminal and splitting the incident optical packet into M replicas of the optical packet;

M optical combiners associated respectively with M outlet terminals of the network, each of the optical combiners receiving N optical packets incident thereon and combining the incident N optical packets into a combined optical signal and coupling the combined optical signal to the associated outlet terminal;

first and second arrays of optical gates, each optical gate establishing a path between input and output ends thereof upon time coincidence between light energy and electrical energy applied thereto, and each of the array being divided into M sets of N optical gates each;

the N optical gates of each set of the first array being connected respectively at input ends thereof to the N optical splitters, each optical gate of each set receiving one of M replicas of an optical packet incident from the corresponding optical splitter and allowing passage of the incident replica therethrough upon time coincidence between the first header of the incident replica and first electrical energy;

the M sets of the second array corresponding respectively to the M optical combiners, and the N optical gates of each set of the second arrays being respectively connected at input ends thereof to the N optical gates of each set of the first array and connected at output ends thereof to the optical combiner to which the set of the optical gates corresponds, each optical gate of the second array receiving an optical packet incident from the first array and allowing passage of the incident optical packet therethrough upon time coincidence between the second header of the incident packet and second electrical energy, wherein the optical gates of each array are assigned a unique time interval and the first headers of optical packets incident on the optical gates of the first array occur at different points within said unique time interval and the second headers of optical packets incident on the optical gates of the second array have different light intensities; and gate control means for supplying a gate control electrical signal of a predetermined waveform to each set of optical gates of said first array during M successive intervals as said first electrical energy, subsequently supplying a gate control electrical signal of a predetermined waveform to each set of optical gates of said second array during M successive intervals as said second electrical energy so that one of the N optical gates of a given set of the second array exclusively allows passage of an optical packet incident thereon when the light intensity of the second header of the incident optical packet is the highest of the second headers of the optical packets incident on the N optical gates of said given set.

9. An optical self-routing network for self-routing an optical packet having a first and a second header, comprising:

a plurality of pairs of first-stage optical gates, each optical gate allowing passage of an optical packet incident thereon when the first header of said incident optical packet timely coincides with first electrical energy applied thereto;

a plurality of first optical combiners associated respectively with said pairs of first-stage optical gates, each of the optical combiners receiving optical packets incident from the first-stage optical gates of the associated pair and combining the incident optical packets;

a plurality of pairs of second-stage optical gates associated respectively with said optical combiners, each of the second-stage optical gates receiving an optical packet incident thereon from the associated combiner and allowing passage of the incident optical packet when the second header of said incident optical packet timely coincides with second electrical energy applied thereto;

means for receiving optical packets incident from the second-stage optical gates into one or more optical signals and combining the incident optical packets; and gate control means for simultaneously supplying gate control electrical signals of predetermined amplitudes respectively to the first-stage optical gates of each pair as said first electrical energy so that one of the first-stage optical gates of a given pair exclusively allows passage of an optical packet incident thereon when the amplitude of the gate control electrical signal applied thereto is the highest of the signals applied to the optical gates of said given pair, and subsequently simultaneously supplying gate control electrical signals of predetermined amplitudes respectively to the second-stage optical gates as said second electrical energy so that one of the second-stage optical gates exclusively allows passage of an optical packet incident thereon when the amplitude of the gate control electrical signal applied thereto is the highest of the signals applied to the second-stage optical gates.

10. An optical self-routing network for self-routing an optical packet having a first and a second header, comprising:

M self-routing circuits, each of the circuits comprising:

N first-stage optical gates, each of the first-stage optical gates allowing passage of an optical packet incident thereon when the first header of said incident optical packet timely coincides with first electrical energy applied thereto;

N/2 first-stage optical combiners associated respectively with a pair of said first-stage optical gates, each of the first-stage optical combiners receiving optical packets incident from the first-stage optical gates of the associated pair and combining the incident optical packets;

N/2 second-stage optical gates associated respectively with said optical combiners, each of the second-stage optical gates receiving an optical packet incident thereon from the associated combiner and allowing passage of the incident optical packet when the second header of said incident optical packet timely coincides with second electrical energy applied thereto; and N/4 second-stage optical combiners associated respectively with a pair of said second-stage gates for receiving optical packets incident from the second-stage optical gates of the associated pair and combining the incident optical packets;

N optical splitters associated respectively with N inlet terminals, each of the splitters splitting an optical packet from the associated inlet terminal into M replicas of the optical packet and coupling each replica of the optical packet to a respective one of the N first-stage optical gates of one of said M self-routing circuits; and gate control means for simultaneously supplying gate control electrical signals of predetermined amplitudes respectively to the first-stage optical gates of each pair as said first electrical energy so that one of the first-stage optical gates of a given pair exclusively allows passage of an optical packet incident thereon when the amplitude of the gate control electrical signal applied thereto is the highest of the signals applied to the optical gates of said given pair, and subsequently simultaneously supplying gate control electrical signals of predetermined amplitudes respectively to the second-stage optical gates of each pair as said second electrical energy so that one of the second-stage optical gates of a given pair exclusively allows passage of an optical packet applied thereto is the highest of the signals applied to the second stage optical gates of said given pair.

11. An optical self-routing network for self-routing an optical packet having a first and a second header, comprising:

a plurality of pairs of first-stage optical gates, each optical gate allowing passage of an optical packet incident thereon when the first header of said incident optical packet timely coincides with first electrical energy applied thereto;

a plurality of second-stage optical gates associated with incident from the first-stage optical gates receiving an optical packet incident thereon from the associated combiner and allowing passage of the incident optical packet when the second header of said incident optical packet timely coincides with second electrical energy applied thereto;

means for receiving optical packets incident from the second-stage optical gates and combining the incident optical packets; and gate control means for simultaneously supplying a gate control electrical signal of a predetermined waveform to the first-stage optical gates as said first electrical energy so that one of the first-stage optical gates of a given pair exclusively allows air passage of an optical packet incident thereon when the light intensity of the first header of the incident optical packet is the highest of the first headers incident on the optical gates of said given pair, and subsequently simultaneously supplying a gate control electrical signal of a predetermined waveform to the second-stage optical gates as said second electrical energy so that one of the second-stage optical gates exclusively allows passage of an optical packet incident thereon when the light intensity of the second header of the incident optical packet is the highest of the second headers incident on the second-stage optical gates.

12. An optical self-routing network self-routing an optical packet having a first and a second header, comprising:

M self-routing circuits, each of the circuits comprising:

N first-stage optical gates, each of the first-stage optical gates allowing passage of an optical packet incident thereon when the first header of said incident optical packet timely coincides with first electrical energy applied thereto;

N/2 first-stage optical combiners associated respectively with a pair of said first-stage optical gates, each of the first-stage optical combiners receiving optical packets incident from the first-stage optical gates of the associated pair and combining the incident optical packets;

N/2 second-stage optical gates associated respectively with said optical combiners, each of the second-stage optical gates receiving an optical packet incident thereon from the associated combiner and allowing passage of the incident optical packet when the second header of said incident optical packet timely coincides with second electrical energy applied thereto; and N/4 second-stage optical combiners associated respectively with a pair of second-stage optical gates for receiving optical packets incident from the second-stage optical gates of the associated pair and combining the incident optical packets;

N optical splitters associated respectively with N inlet terminals, each of the splitters splitting an optical packet from the associated inlet terminal into M replicas of the optical packet and coupling each replica of the optical packet to a respective one of the N first-stage optical gates of one of said M self-routing circuits; and gate control means for simultaneously supplying a gate control electrical signal of a predetermined waveform to the first-stage optical gates of each pair as said first electrical energy so that one of the first-stage optical gates of a given pair exclusively allows passage of an optical packet incident thereon when the light intensity of the first header of the incident optical packet is the highest of the first headers incident on the optical gates of said given pair, and subsequently simultaneously supplying a gate control electrical signal of a predetermined waveform to the second-stage optical gates of each pair as said second electrical energy so that one of the second-stage optical gates of a given pair exclusively allows passage of an optical packet incident thereon when the light intensity of the second header of the incident optical packet is the highest of the second headers incident on the second-stage optical gates of said given pair.

13. An optical self-routing network for self-routing an optical packet having a header, comprising:

N optical splitters associated respectively with N inlet terminals of the network, each of the splitters receiving an optical packet incident from the associated inlet terminal and splitting the incident optical packet into M replicas of the optical packet;

M sets of optical gates, each optical gate receiving an optical packet incident thereon and allowing passage of the incident optical packet when the header of said incident optical packet timely coincides with electrical energy applied thereto;

M optical combiners associated respectively with the M sets of optical gates, each optical combiner receiving optical packet incident from the optical gates of the associated set and combining the incident optical packets into a combined optical signal and coupling the combined optical signal to an outlet terminal of the network; and gate control means for simultaneously supplying gate control electrical signals of predetermined amplitudes respectively to the optical gates of each set as electrical energy so that one of the optical gates of a given set exclusively allows passage of an optical packet incident thereon when the amplitude of the gate control electrical signal applied thereto is the highest of the signals applied to the optical gates of the given set.

14. An optical network for self-routing an optical packet having a header, comprising:

N optical splitters associated respectively with N inlet terminals of the network, each of the splitters receiving an optical packet incident from the associated inlet terminal and splitting the incident optical packet into M replicas of the optical packet;

M sets of optical gates, each optical gate receiving an optical packet incident thereon and allowing passage of the incident optical packet when the header of said incident optical packet timely coincides with electrical energy applied thereto;

M optical combiners associated respectively with the M sets of optical gates, each optical combiner receiving optical packets incident from the optical gates of the associated set and combining the incident optical packets into a combined optical signal and coupling the combined optical signals to an outlet terminal of the network; and gate control means for simultaneously supplying a gate control electrical signal of a predetermined waveform to the optical gates of each set as said electrical energy so that one of the optical gates of a given set exclusively allows passage of an optical packet incident thereon when the light intensity of the header of the incident optical packet is the highest of the headers incident on the optical gates of said given set.

15. An optical serf-routing network as claimed in claim 1, wherein the optical signals applied to said self-routing network are respectively carried on a plurality of wavelengths, and wherein each of said optical gates is selectively transmissive of an optical signal of one of said wavelengths.

16. An optical self-routing network as claimed in claim 15, wherein each of said optical gates comprises a narrow-band optical gate element for passing therethrough an optical packet incident from one side of the optical gate, and a wide-band optical gate element connected to said narrow-band optical gate for passing an optical packet incident from the narrow-band optical gate element to the other side of the optical gate.

17. An optical self-routing network as claimed in claim 4, wherein the optical packets applied to said self-routing network are carried on a plurality of wavelengths, and wherein each of said optical gates is selectively transmissive of an optical packet of one of said wavelengths.

18. An optical self-routing network as claimed in claim 6, wherein the optical packets applied to said self-routing network are carried on a plurality of wavelengths, and wherein each of said optical gates is selectively transmissive of an optical packet of one of said wavelengths.

19. An optical self-routing network as claimed in claim 1, further comprising means disposed between said N optical splitters and said N×M optical gates for passing optical packets from said splitters to said N×M optical gates and directing optical packets returning from said optical gates to said M optical combiners.

* * * * *

UNITED STATES PATENT AND TRADEMARK OFFICE
CERTIFICATE OF CORRECTION

PATENT NO. : 5,341,234
DATED : August 23, 1994
INVENTOR(S) : Shuji SUZUKI et al.

It is certified that error appears in the above-indentified patent and that said Letters Patent is hereby corrected as shown below:

Please note on the Title page of patent in section "[73]", "Nec" should read --NEC--; and after section "[22]", insert --[30]  Foreign Application Priority Data Nov. 14, 1990 [JP] Japan .......... 2-307649

March 1, 1991 [JP] Japan .......... 3-35970

March 27, 1991 [JP] Japan ......... 3-85880

July 18, 1991 [JP] Japan .......... 3-178234--.

Signed and Sealed this

Fourteenth Day of February, 1995

Attest:

BRUCE LEHMAN

*Attesting Officer*       *Commissioner of Patents and Trademarks*